United States Patent
Altshuller

(10) Patent No.: US 12,245,278 B2
(45) Date of Patent: Mar. 4, 2025

(54) SYNCHRONIZED FRAMING SCHEDULING METHODS AND SYSTEMS FOR OFDMA BASED WIRELESS SYSTEMS

(71) Applicant: Commtact LTD, Yavne (IL)

(72) Inventor: Mark Altshuller, Ganot Hadar (IL)

(73) Assignee: Commtact LTD, Yavne (IL)

( * ) Notice: Subject to any disclaimer, the term of this patent is extended or adjusted under 35 U.S.C. 154(b) by 391 days.

(21) Appl. No.: 17/933,987

(22) Filed: Sep. 21, 2022

(65) Prior Publication Data

US 2023/0089936 A1 Mar. 23, 2023

Related U.S. Application Data

(60) Provisional application No. 63/246,863, filed on Sep. 22, 2021.

(51) Int. Cl.
*H04W 56/00* (2009.01)
*H04L 5/14* (2006.01)
(Continued)

(52) U.S. Cl.
CPC ....... *H04W 74/0816* (2013.01); *H04L 5/1469* (2013.01); *H04W 74/0891* (2013.01)

(58) Field of Classification Search
CPC .......... H04W 74/0816; H04W 74/0891; H04L 5/1469
(Continued)

(56) References Cited

U.S. PATENT DOCUMENTS 7,706,249 B2 4/2010 Akita et al.
8,599,822 B2 12/2013 Castagnoli
(Continued)

FOREIGN PATENT DOCUMENTS

GB 2549967 A 11/2017
WO 2016167431 A1 10/2016

OTHER PUBLICATIONS

"Deng et al., Method and Device for Obtaining Interference Intensity Between Cell Systems, Dec. 3, 2021, CN 108990079" (Year: 2017).*

(Continued)

*Primary Examiner* — Sai Ming Chan
(74) *Attorney, Agent, or Firm* — FISHERBROYLES, LLP; Roger L. Browdy; Ronni S. Jillions

(57) ABSTRACT

There are provided methods and systems for scheduling downlink (DL) and uplink (UL) transmissions in one or more Point-to-Multipoint (PTMP) IEEE 802.11 orthogonal frequency division multiple access (OFDMA) based wireless communication networks, each network comprising one or more IEEE 802.11 OFDMA based Access Points (APs) wherein each AP of said one or more APs comprises associate one or more IEEE 802.11 OFDMA stations (STAs), the method comprising the steps of: synchronizing the one or more STAs within each network using one or more synchronization signals transmitted between the one or more APs and the one or more STAs; allocating one or more Framing Slots, wherein each Framing Slot having a fixed time duration; dividing each Framing Slot of said one or more Framing Slots into DL burst transmission and UL burst transmission periods wherein the DL burst transmission periods comprise one or more DL Data Units Bursts and continuously scheduling by said one or more IEEE 802.11 OFDMA based APs the one or more DL Data Units Bursts during said DL transmission period to said one or more STAs; and continuously sending said one or more UL Data Unit Bursts by said one or more STAs to said respective one or more APs.

20 Claims, 17 Drawing Sheets

(51) Int. Cl.
*H04W 74/08* (2009.01)
*H04W 74/0816* (2024.01)

(58) Field of Classification Search
USPC ........................................... 370/329
See application file for complete search history.

(56) References Cited

U.S. PATENT DOCUMENTS

| | | | |
|---|---|---|---|
| 9,742,543 | B2 | 8/2017 | Hedayat |
| 10,181,930 | B2 | 1/2019 | Hedayat |
| 10,264,597 | B2 | 4/2019 | Shahar |
| 10,334,007 | B2 | 6/2019 | Chun et al. |
| 10,448,384 | B2 | 10/2019 | Ghosh |
| 10,469,387 | B2 | 11/2019 | Merlin et al. |
| 10,531,433 | B2 | 1/2020 | Frederiks |
| 10,673,583 | B2 | 6/2020 | Tsai et al. |
| 10,728,780 | B2 | 7/2020 | Keskitalo et al. |
| 10,911,120 | B2 | 2/2021 | Vermani |
| 2007/0201392 | A1* | 8/2007 | Ramachandran ....... H04L 45/00 370/315 |
| 2010/0067589 | A1* | 3/2010 | Schumacher ......... H04W 72/51 370/329 |
| 2012/0322492 | A1 | 12/2012 | Koo |
| 2018/0035387 | A1 | 2/2018 | Yang |
| 2018/0263047 | A1 | 9/2018 | Kim |
| 2021/0068096 | A1 | 3/2021 | Abedini et al. |

OTHER PUBLICATIONS

"Baker et al., Starting Reaction Dispatching Method and Device of Terminal Peer Communication Link in the Wireless OFDMA System, Dec. 28, 2011, CN 102301668" (Year: 2010).*

"Lv et al., Wireless Regional Area Network and Method for Adjusting Subdistrict Synchronization, Oct. 17, 2007, CN 101056135" (Year: 2006).*

IEEE Computer Society, Part 11: Wireless LAN Medium Access Control (MAC) and Physical Layer (PHY) Specifications, pp. 1-82, 2016.

IEEE 802.11-2016, Draft Standard, 2019, pp. 1-780.

* cited by examiner

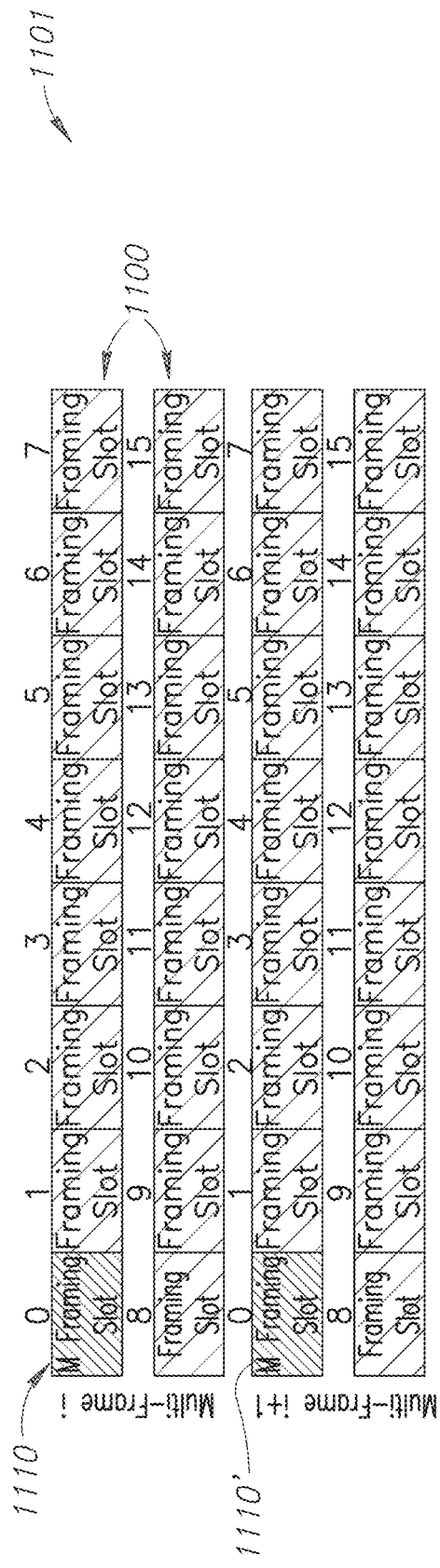
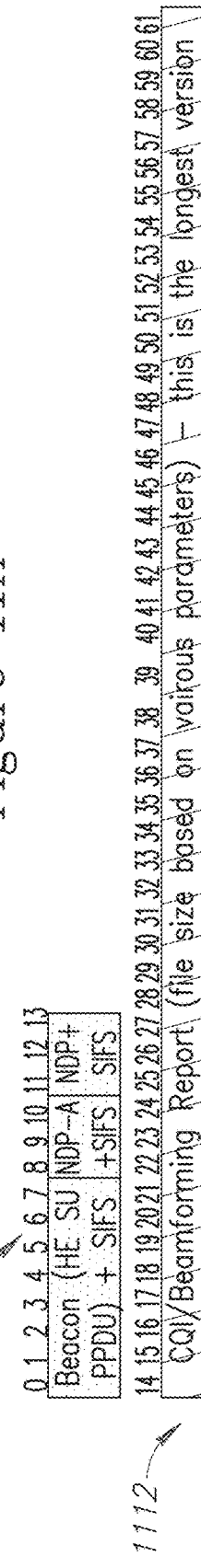
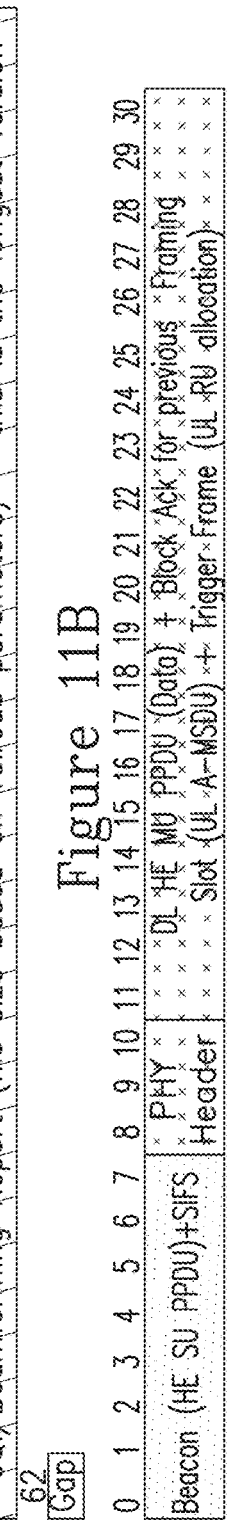
Figure 11A
Figure 11B
Figure 11C

SYNCHRONIZED FRAMING SCHEDULING METHODS AND SYSTEMS FOR OFDMA BASED WIRELESS SYSTEMS

CROSS-REFERENCE

The present application claims priority to U.S. Provisional Application Ser. No. 63/246,863 filed on Sep. 22, 2021, entitled "SYNCHRONIZED FRAMING SCHEDULER METHODS AND SYSTEMS FOR OFDMA BASED WIRELESS SYSTEMS" which is incorporated herein by reference in its entirety.

INCORPORATION BY REFERENCE

All publications, patents, and patent applications mentioned in this specification are herein incorporated by reference to the same extent as if each individual publication, patent, or patent application was specifically and individually indicated to be incorporated by reference.

TECHNICAL FIELD

The present invention, in some embodiments thereof, relates to synchronized framing scheduling methods and systems, and more specifically, but not exclusively, to synchronized framing scheduling methods and systems for OFDMA (Orthogonal Frequency-Division Multiple Access) based wireless systems such as IEEE 802.11 standard for wireless local-area networks.

BACKGROUND OF THE INVENTION

Typical IEEE 802.11 (which is the standard body for WiFi products) supports Carrier-Sense Multiple Access with Collision Avoidance (CSMA/CA) scheduling mechanism, also known as LBT ("Listen Before Talk") mechanism. Such LBT mechanism is essential in unlicensed frequency bands used by WiFi devices where multiple devices compete for the air resource. FIG. 1 shows 802.11 CSMA/CA scheduler mechanism, which enables the standard WiFi LBT approach, in accordance with the prior art. In 802.11 communication networks, all stations (or wireless nodes) such as the sender/receiver and other stations have equal access to the air resource. When a station wishes to send data over the air, the station must listen to DIFS (DCF (Distributed coordination function) Interframe Space) timer and if other signals are not received and the air is free, the station may send 802.11 data frame (known as PPDU-Physical Layer Protocol Data Unit) to other stations. In accordance with the prior art, at a unicast communication (802.11) the sender addresses the PPDU to a specific receiver station. Accordingly, the receiver station should acknowledge the received PPDU during the short SIFS (Short InterFrame Space) timer.

For cases where many stations wish to send PPDUs, the IEEE 802.11 standard defined a backoff/contention window mechanism to avoid or minimize collision between the stations. However, when massive communication is required, the current 802.11 CSMA/CA scheduling method has a very large overhead due to backoff mechanism to avoid a collision. Therefore, for better radio link utilization for massive communication scenarios, the industry developed TDMA (Time Division Multiple Access) based scheduler on top of 802.11 PHY.

Around the year 2000 many companies discovered that 802.11 standard solutions are efficient not only for unlicensed home usage but also for Private Wireless Networks, where high quality, high scalability and inter-cell interference management are required. In order to withstand such requirements, some companies developed proprietary wireless solutions for private network use cases using synchronized TDMA protocol based on previous 802.11 standard versions.

Accordingly, legacy 802.11 standards (last one is 802.11ac) used OFDM PHY/MAC structure. Later on, IEEE 802.11ax-2021 standard for wireless local-area networks (WLANs) defined a completely new OFDMA PHY framing structure compared to the prior OFDM (Orthogonal frequency-division multiplexing) based structure of previous 802.11 versions.

FIG. 2 illustrates the conceptual difference between OFDM and OFDMA framing structure, according to the prior art. Specifically, as illustrated by the two different framing structures, OFDM is configured to enable point-to-multipoint (PTMP) communication using only time domain, meaning that during specific time periods only one device communicates with other APs (Access Point) or STA as shown in FIG. 3 (OFDM TDMA based PTMP Communication), while OFDMA enables multiple devices to communicate with the AP simultaneously and therefore OFDMA leverages more flexible radio resources allocation in time and frequency domains as shown in FIG. 4 (OFDMA PTMP Communication).

Still, legacy 802.11 standards OFDM PHY/MAC based structure as well as current IEEE 802.11ax-2021 standard for wireless local-area networks (WLANs) OFDMA PHY based structure are both using CSMA/CA as in previous 802.11 and providing opportunistic, non-synchronized scheduling process, which doesn't enable DL and UL continuous behavior (e.g. DL and UL transmission opportunities are not managed) and therefore may not effectively compete or replace 4G, 5G, and other 3GPP communication standards.

Specifically, CSMA/CA in 802.11 is the scheduling mechanism which defines the transmission opportunities period of 802.11 devices after sensing the wireless media to avoid the collision of multiple 802.11 devices transmitting simultaneously. As shown in FIG. 1 the sensing timing and collision avoidance mechanisms as defined in 802.11 OFDMA-based scheduler use CSMA/CA scheduling in the following manner: DL and UL have a sequence of transmission bursts between AP and STAs (as shown in FIG. 5). To avoid other 802.11 devices interfering with this sequence, 802.11 protocol uses TXoP (Tx Opportunity) timeout, which indicates all other 802.11 devices in the proximity area to be quiet during this period. Thereafter, 802.11ax opens opportunity for other 802.11 devices transmission once DL or UL sequence is completed and therefore does not allow continuous and synchronized communication as provided for example by 4G and 5G radio networks.

In light of the above, an improved scheduling methods and systems using a new framing structure that overcomes at least some of the above mentioned deficiencies of the prior scheduling methods would be beneficial. Ideally, such a should enable simultaneous switching between downlink and uplink transmission, massive communication, latency, fast roaming, overhead reduction convenient and convenient to use.

SUMMARY OF THE INVENTION

In accordance with a first embodiment of the present invention there is provided a method for scheduling downlink (DL) and uplink (UL) transmissions in Point-to-Multipoint (PTMP) one or more IEEE 802.11 orthogonal frequency division multiple access (OFDMA) based wireless communication networks, each network comprising one or more IEEE 802.11 OFDMA based Access Points (APs) wherein each AP of said one or more APs comprises associated IEEE 802.11 OFDMA stations (STAs), the method comprising the steps of: synchronizing the one or more STAs within each network using one or more synchronization signals transmitted between the one or more APs and the one or more STAs; allocating one or more Framing Slots, wherein each Framing Slot having a fixed time duration; dividing each Framing Slot of said one or more Framing Slots into DL burst transmission and UL burst transmission periods wherein the DL burst transmission periods comprise one or more DL Data Units Bursts and wherein each DL Data Unit Burst of said one or more DL Data Units Bursts comprises:

DL PHY header comprising DL scheduling instructions to allocate one or more Resource Units (RUs) to said one or more STAs;

DL MAC and Data as allocated in the allocated RUs per said one or more STAs as indicated in the DL PHY header;

DL Trigger Frame comprising additional instructions for UL communication comprising RU allocation per said one or more STAs;

Acknowledgment (Ack) or Block Acknowledgement (B Ack) for a UL data transmission from said one or more STAs transmitted during previous Framing Slots;

and wherein the UL burst transmission periods comprise one or more UL Data Units Bursts, wherein each UL Data Unit Burst of said one or more UL Data Units Bursts comprises:

UL PHY Header comprising parameters as received in the DL Trigger Frame;

UL MAC Header and Data allocated in RU as received in the DL trigger frame;

Acknowledgment or Block Acknowledgement for the DL Data Units Bursts transmitted in the same or previous Framing Slots;

continuously scheduling by said one or more IEEE 802.11 OFDMA based APs the one or more DL Data Units Bursts during said DL transmission period to said one or more STAs; and continuously sending said one or more UL Data Unit Bursts by said one or more STAs to said respective one or more APs.

In an embodiment, the DL and UL burst transmission periods in the one or more Framing Slots have different time durations and wherein the time durations ratio between them defines TDD split.

In an embodiment, each of said UL Data Unit Bursts or said DL Data Unit Bursts may have different time length based on the one or more APs scheduling decision, and wherein the total time length of UL Data Unit Bursts cannot exceed the UL transmission period time and wherein the total time length of DL Data Unit Bursts cannot exceed the DL transmission period.

In an embodiment, the DL Data Unit Bursts or UL Data Unit Bursts comprises using PPDU 802.11 frames in the DL or UL direction.

In an embodiment, the method further comprising: communicating with any associated and non-associate STAs approaching said one or more APs using UORA (Uplink OFDMA Random Access) mechanism as in said DL Trigger Frame.

In an embodiment, the method further comprising allocating different RU of different STAs by different Data Units bursts.

In an embodiment, the method further comprising: generating one or more Multi-Frames, each said one or more Multi-Frames comprising a plurality of said one or more Framing Slots wherein each Framing Slot of said plurality Framing Slots is numbered and wherein one or more of said plurality Framing Slots is allocated as a Maintenance Framing Slot.

In an embodiment, the Maintenance Framing Slot comprising: information broadcasting, said information broadcasting comprises Framing Slot scheduling profile announcement per following Multi-Frame and beamforming training procedures within the Maintenance Framing Slot.

In an embodiment, the method further comprising: broadcasting the Multi-Frame duration by the one or more APs to the one or more STAs by the Maintenance Framing Slot to the following Multi-Frames to synchronize said Framing Slot sequence between the AP and STAs.

In an embodiment, the Maintenance Framing Slot comprises a Beacon message for broadcasting specific network information and optionally Beamforming Training procedure.

In an embodiment, the Framing Slot numbering is derived from a Timestamp transmitted in each Data Unit Burst.

In an embodiment, the Multi-Frame is a semi-synchronous Multi-Frame for scheduling the DL and UL transmissions between the one or more APs and the one or more STAs and wherein the semi-synchronous Multi-Frame is configured to synchronize between the one or more APs and associated one or more STAs, but not synchronize between the one or more APs within the same network.

In accordance with a second embodiment of the present invention there is provided a Multi-Frame structure for scheduling downlink (DL) and uplink (UL) transmissions between an access point (AP) and a plurality of stations (STAs) in an orthogonal frequency division multiple access (OFDMA) wireless communication system, the Multi-Frame structure comprising:

multiple Framing Slots, wherein each of said multiple Framing Slots is numbered across the same synchronized network and wherein one of said multiple Framing Slots is allocated as a Maintenance Framing Slot, said Maintenance Framing Slot comprising:

information broadcasting, said information broadcasting comprises Framing Slot scheduling profile announcement per following Multi-Frame and beamforming training procedures within the Maintenance Framing Slot.

In an embodiment, the Maintenance Framing Slot has the same time duration as each of the other Framing Slots or doesn't have the same time duration as the other Framing Slots.

In accordance with a third embodiment of the present invention there is provided an IEEE 802.11 OFDMA based Access Point (AP) for scheduling one or more Framing Slots between the AP and a plurality of stations (STAs) in an 802.11 orthogonal frequency division multiple access (OFDMA) based wireless communication network, said AP comprising:

at least one synchronization source for time synchronization in said OFDMA wireless communication system;

at least one transceiver used to transmit or receive wireless signals; and at least one processor in communication with said at least one transceiver, said processor is used to control the transceiver and wherein the processor comprises instructions to:

synchronize the plurality of STAs within the network using one or more synchronization signals over the air transmitted between the AP and the plurality of STAs;

allocate the one or more Framing Slots, wherein each Framing Slot of said plurality of Framing Slots having a fixed time duration, and wherein each Framing Slot of the one or more Framing Slots is divided into DL burst transmission and UL burst transmission periods, wherein the DL burst transmission period comprises one or more DL Data Units Bursts and wherein each DL Data Unit of said one or more DL Data Units Bursts comprises:

DL PHY header comprising DL scheduling instructions to allocate one or more Resource Units (Rus) to one or more STAs;

DL MAC and Data as allocated in the allocated RUs per STAs as indicated in the DL PHY header;

DL Trigger Frame with additional instructions for UL communication comprising RU allocation per STA;

Acknowledgment (Ack) or Block Acknowledgement (B Ack) for a UL data transmission from STAs transmitted during previous Framing Slots;

and wherein the UL burst transmission period comprises one or more UL Data Units Bursts and wherein each UL Data Unit Burst of said one or more UL Data Units Bursts comprises:

UL PHY Header comprising parameters as received in the DL Trigger Frame;

UL MAC Header and Data allocated in RU as received in the DL trigger frame;

Acknowledgment or Block Acknowledgement for the DL Data Units Bursts transmitted in the same or previous Framing Slots;

continuously schedule by said AP the one or more DL Data Units Bursts during said DL transmission period to said one or more STAs; and continuously send said one or more UL Data Unit Bursts by said one or more STAs to said AP.

In an embodiment, the DL and UL burst transmission periods in the Framing Slot have different time durations and wherein the time durations ratio between them defines TDD split.

In an embodiment, each of said UL Data Unit Bursts or said DL Data Unit Bursts may have different time length based on the AP scheduling decision, and wherein the total time length of the one or more UL Data Unit Bursts cannot exceed the UL transmission period time and wherein the total time length of DL Data Unit Bursts cannot exceed the DL transmission period.

In an embodiment, the plurality of Framing Slots are scheduled in a Multi-Frame.

In an embodiment, the plurality of Framing Slots in said Multi-Frame are numbered and wherein one or more of said plurality Framing Slots is allocated as a Maintenance Framing Slot.

In an embodiment, the Multi-Frame is a semi-synchronous Multi-Frame.

BRIEF DESCRIPTION OF THE DRAWINGS

A better understanding of the features and advantages of the present disclosure will be obtained by reference to the following detailed description that sets forth illustrative embodiments, in which the principles of embodiments of the present disclosure are utilized, and the accompanying drawings.

FIGS. 9A-9C illustrate 802.11ax UORA mechanism, in accordance with the prior art;

FIG. 11A shows a Multi-Frame Structure, in accordance with embodiments;

FIG. 11B shows a Maintenance Framing Slot (Synchronous Mode) with Long BF Training, in accordance with embodiments;

FIG. 11C shows a Maintenance Framing Slot w/o BF Training, in accordance with embodiments;

DETAILED DESCRIPTION OF THE INVENTION

Figure 1:
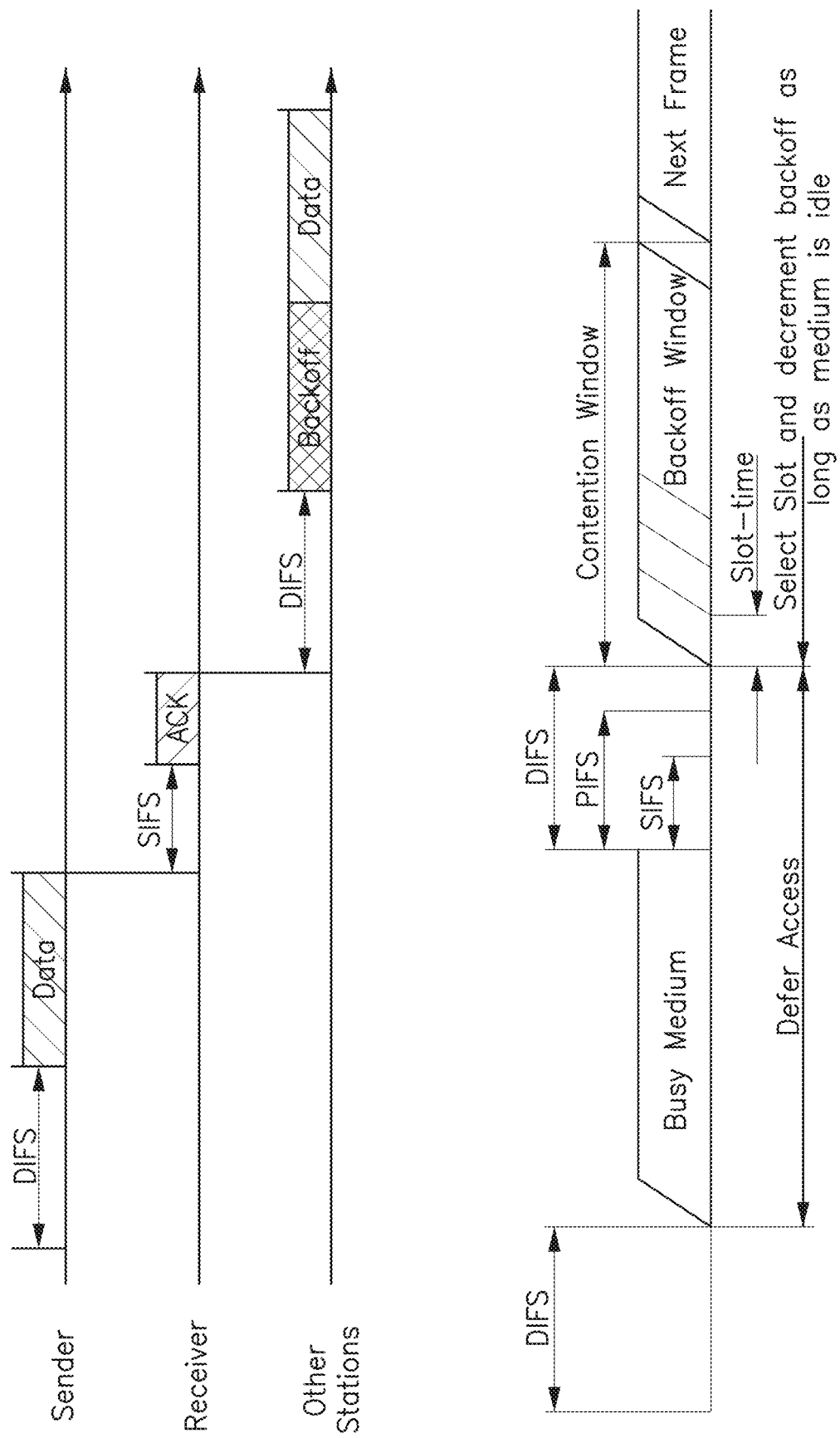
FIG. 1 shows 802.11 CSMA/CA scheduling mechanism, in accordance with the prior art.
Figure 2:
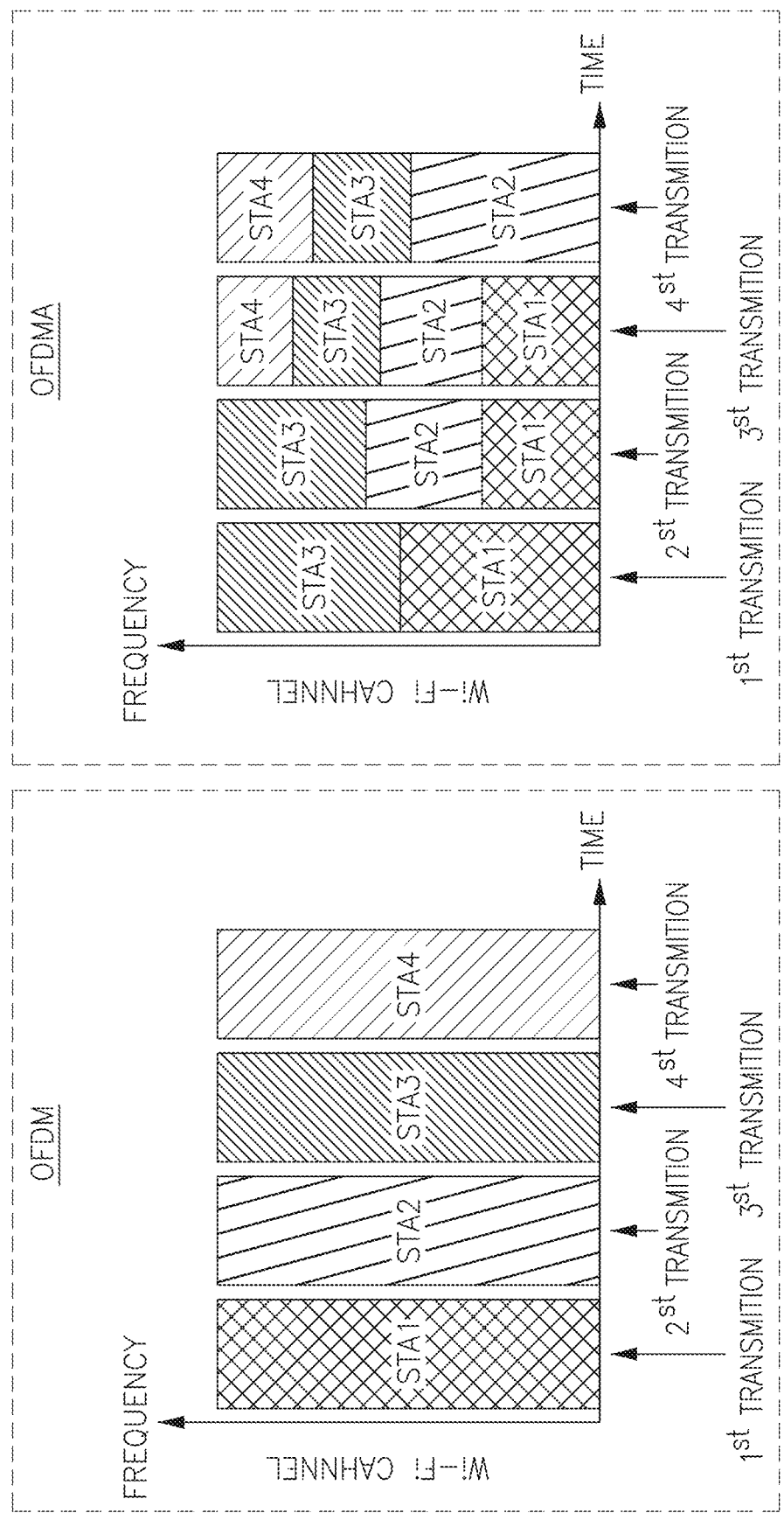
FIG. 2 illustrates the conceptual difference between OFDM vs OFDMA, in accordance with the prior art.
Figure 3:
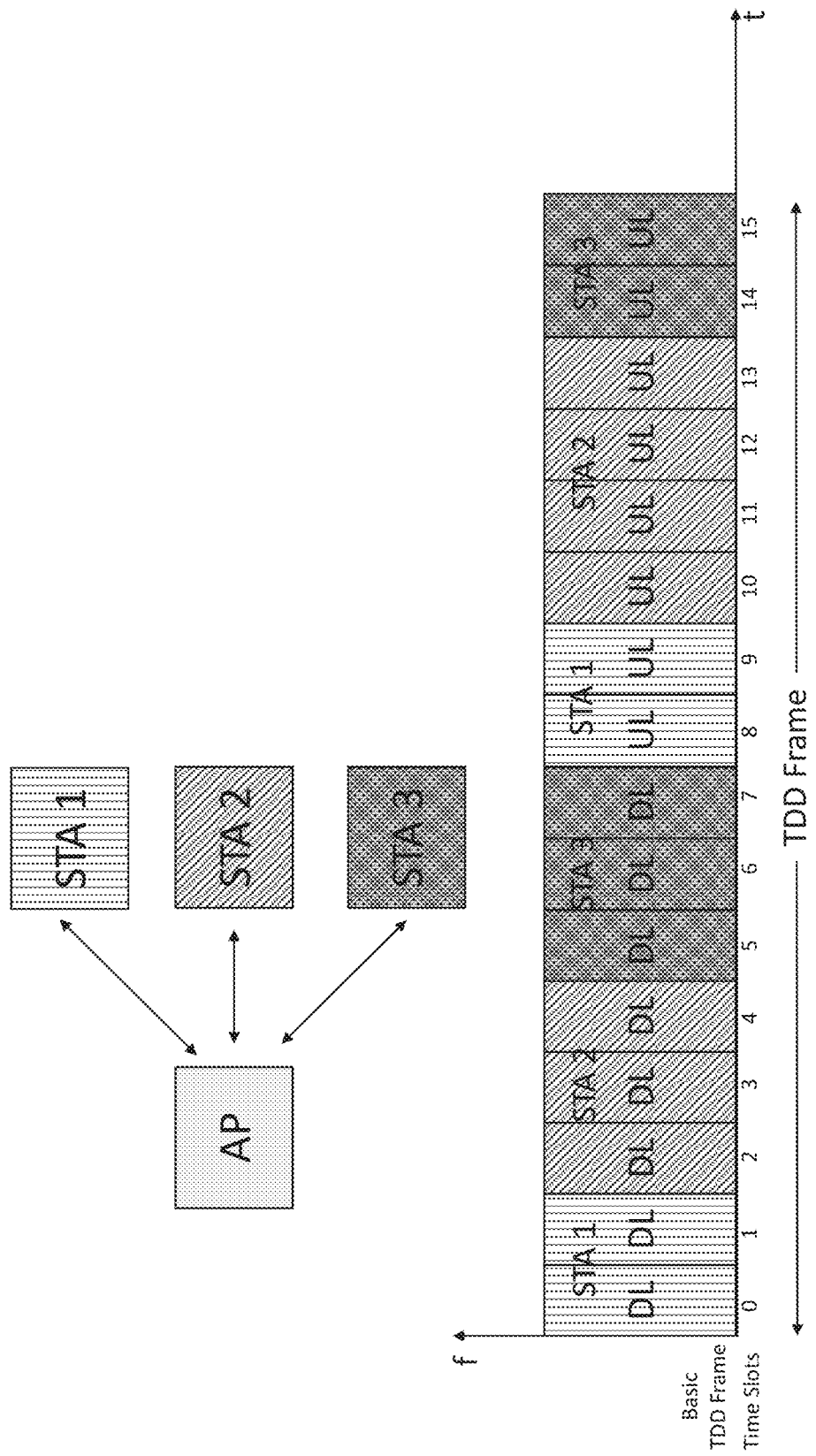
FIG. 3 illustrates an OFDM TDMA-based Point to Multipoint communication system, in accordance with the prior art.
Figure 4:
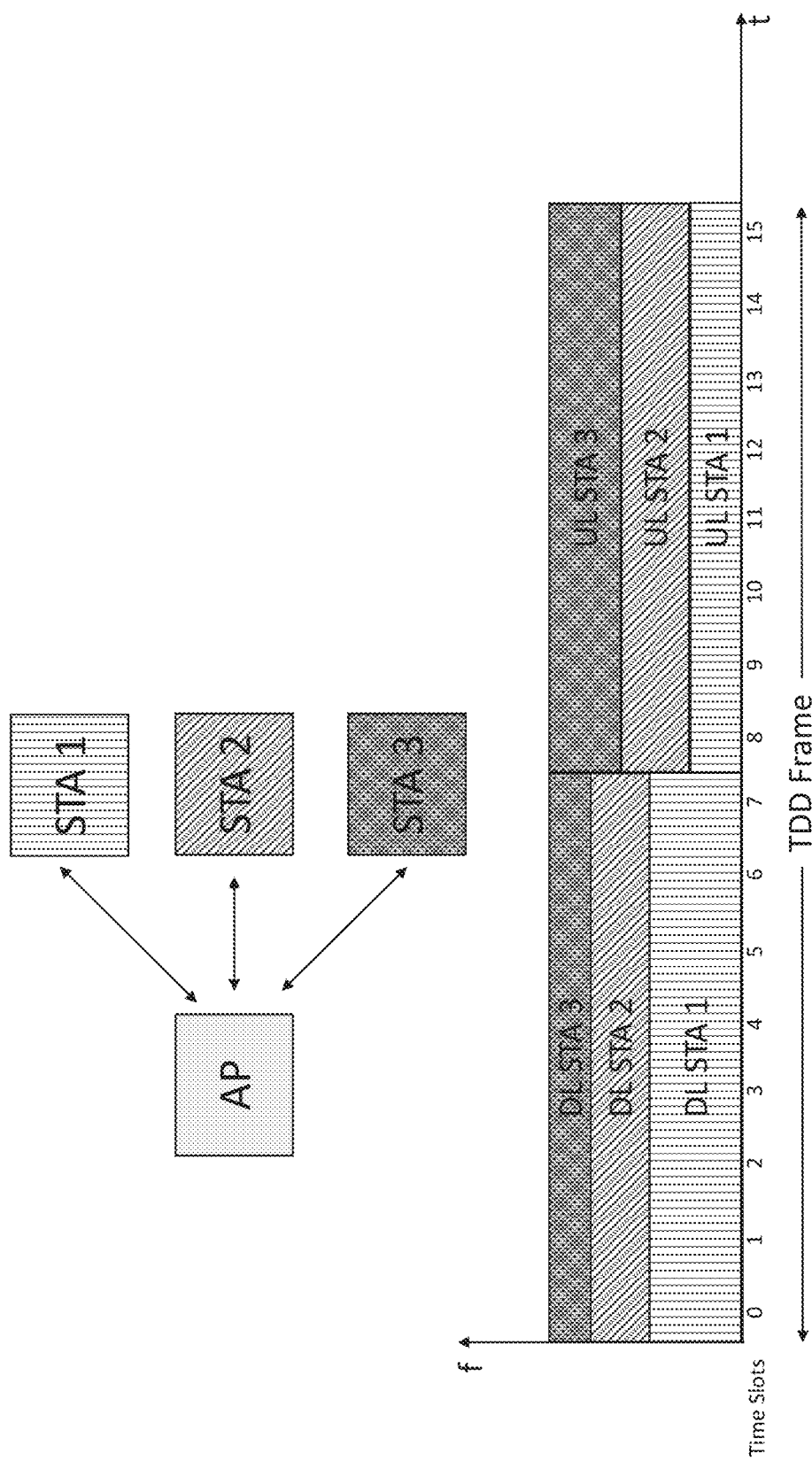
FIG. 4 shows OFDMA PTMP Communication and TDD frame, in accordance with the prior art.

In the following description, various aspects of the invention will be described. For the purposes of explanation, specific details are set forth in order to provide a thorough understanding of the invention. It will be apparent to one skilled in the art that there are other embodiments of the invention that differ in details without affecting the essential nature thereof. Therefore, the invention is not limited by that which is illustrated in the figure and described in the specification, but only as indicated in the accompanying claims, with the proper scope determined only by the broadest interpretation of said claims.

Prior to the detailed specification of the invention being set forth, it may be helpful to set forth definitions of certain terms that will be used hereinafter.

As used herein, the term "Datagram(s)" as used herein will generally mean control and data information transmitted after the PHY header.

"Transmission Burst(s)" or "DL burst' Transmission or "UL burst' Transmission or 'OFDM burst' as used herein will generally mean a broadcast of a relatively high-bandwidth transmission over a short period.

"Data Unit(s)" or "Data Unit Burst(s)" as used herein will generally mean a physical layer (PHY) frame (i.e. the unit of data exchanged between PHY entities). In some cases, Data Unit may be PPDU as defined by IEEE 802.11 standard.

"Resource Unit(s)" (RU), as used herein, will generally mean a group of subcarriers allocated for transmission for specific purposes, e.g. STA allocation and the like, as defined by IEEE 802.11ax amendment (for example each block in Datagram as shown herein below with respect to FIG. 8).

The present invention, in some embodiments thereof, relates to synchronized framing scheduling methods, devices and systems for enabling high-quality communication in a wireless network, and, more specifically, but not exclusively, to synchronized framing scheduling methods for OFDMA-based wireless systems such as IEEE 802.11 standard releases for example 802.11ax.

Some of the following examples relate to the version IEEE 802.11-2016 System Description Document and following amendments (e.g. 802.11ax) which are incorporated herein by reference, hence, terms which need clarification beyond that which is provided herein can be found in these documents.

To support the new OFDMA structure, the 802.11ax standard amendments specified completely new PHY & MAC processes, which didn't exist in previous 802.11 versions. For example, the 802.11ax standard amendments include downlink (DL) and uplink (UL) resource scheduling, UL poling (using Trigger Control Frame), and process for updating existing processes as specified for example in IEEE 802.11-2016 standard (e.g. RTS/CTS, Beamforming Training, NAV), which is incorporated herein by reference.

As TDMA/OFDM-based synchronized scheduling mechanism is not efficient for the new OFDMA-based IEEE 802.11 communication (as was specified in IEEE 802.11ax amendment), the present invention defines a new synchronized framed scheduling methods devices and systems which includes generating sets of new mechanisms to enable high-quality communication as required for example by Industry 4.0. Advantageously, the framed scheduling methods and systems, in accordance with embodiments, may effectively compete and/or replace 4G, 5G and other 3GPP communication standards as it includes using cost-effective 802.11 ecosystems.

Figure 5:
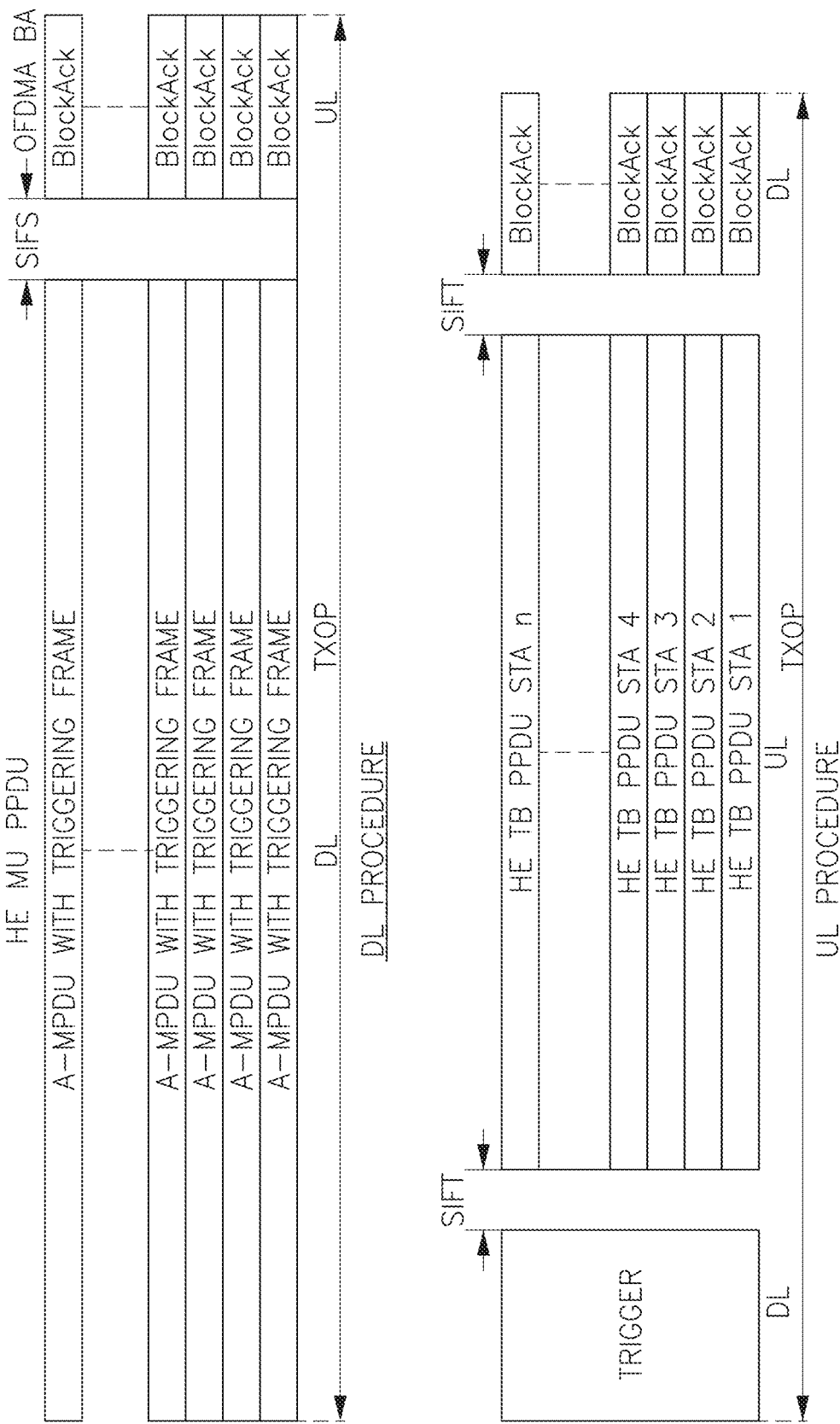
FIG. 5 illustrates an 802.11ax Downlink and Uplink procedures, in accordance with the prior art.

Specifically, the major reused IEEE 802.11ax mechanisms, in accordance with the prior art, may include for example:
Downlink and Uplink procedures (as shown in FIG. 5—IEEE 802.11ax Downlink and Uplink procedures);
RU (Resource Unit) structure (as shown in FIG. 6—802.11ax RU (Resource Unit) Structure).

Figure 6:
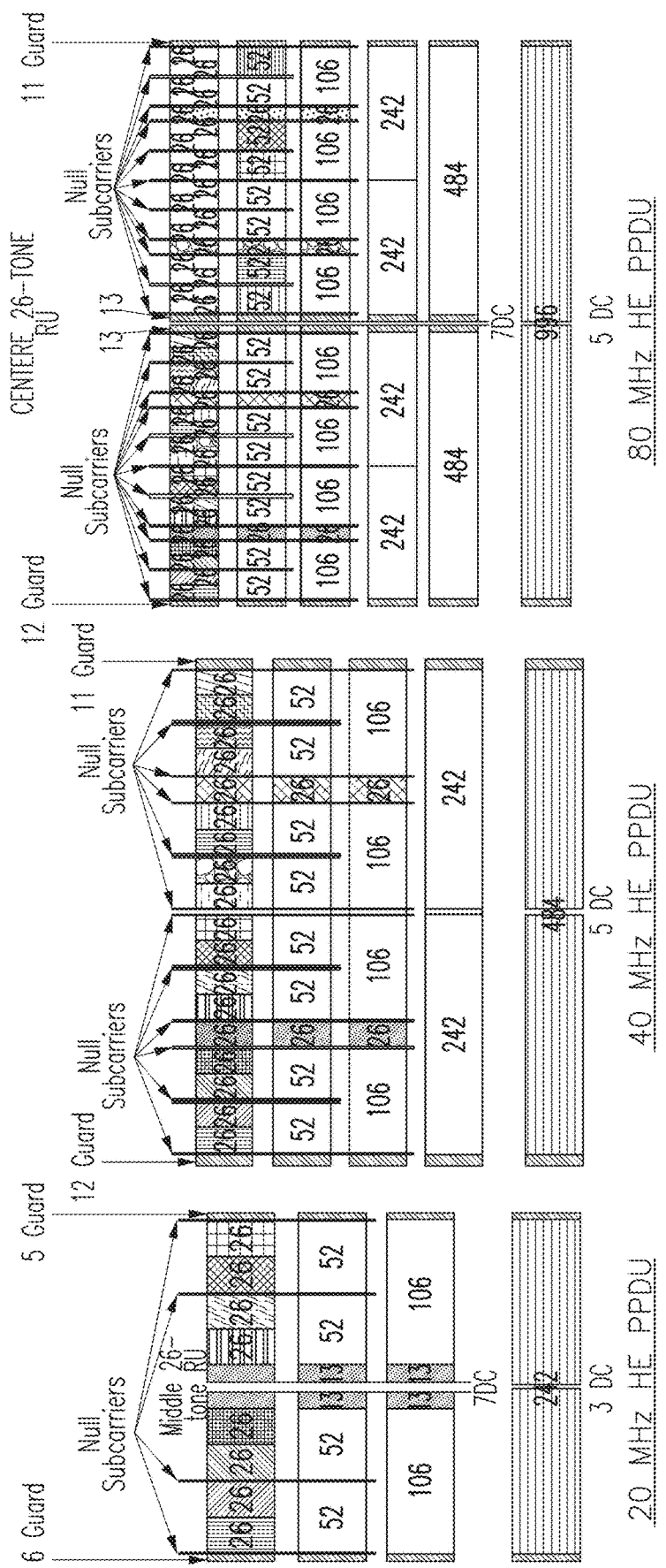
FIG. 6 illustrates 802.11ax RU (Resource Unit) Structure, in accordance with the prior art.

Specifically, FIG. 6 shows the RUs as shown in the standard while the AP can assign RU size for the STAs in DL or UL directions per traffic demand. The numbers in each block represent the number of OFDM subcarriers for each RU. Hence, the standard as illustrated in FIG. 6 is strict and mandatory with respect to the number of subcarriers in each RU. It should be noted that though the present invention description assumes TDD (Time Division Duplex) communication, the scheduling mechanism, in accordance with embodiments, is also applicable for FDD (Frequency Division Duplex), HD-FDD (Half Duplex FDD) communication types, and the like.

Figure 7A:
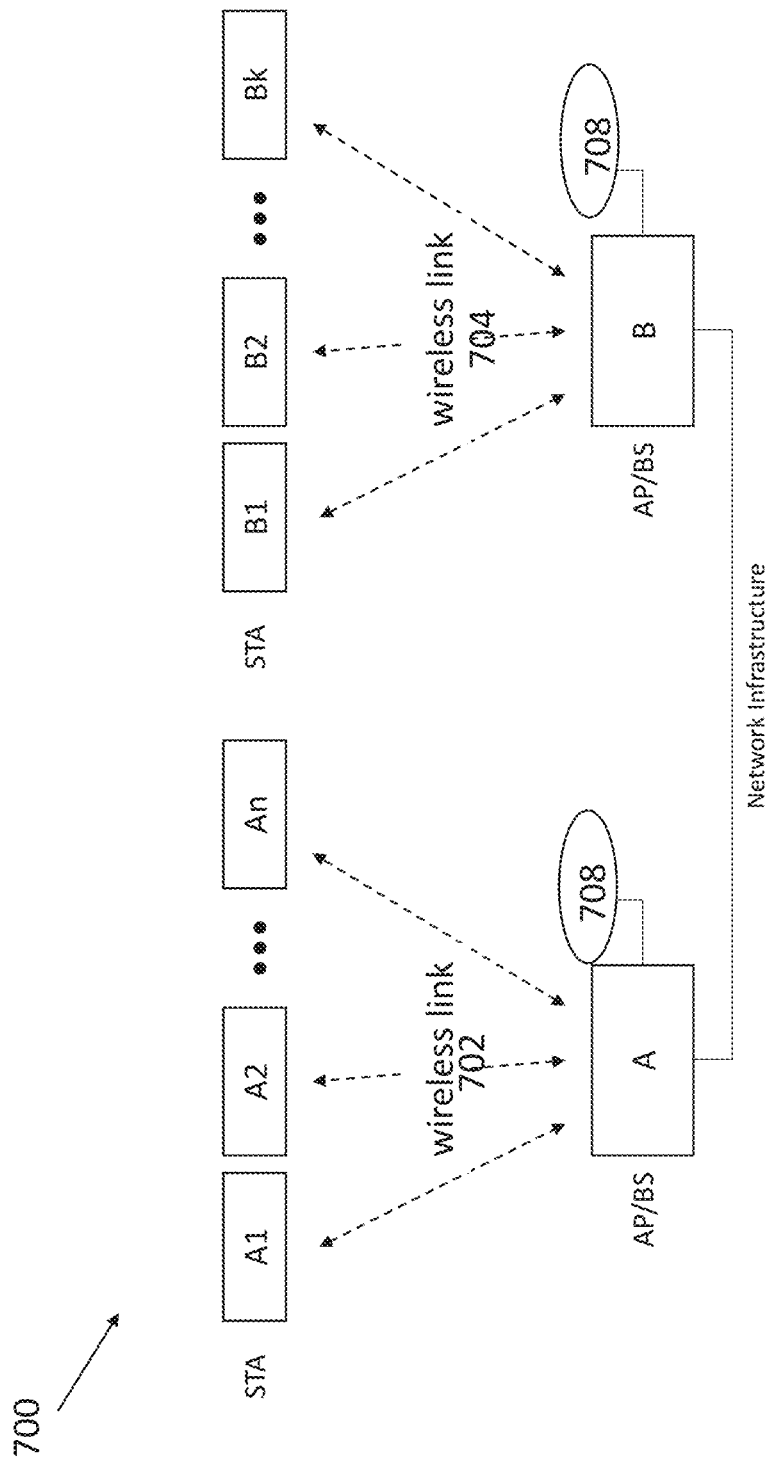
FIG. 7A illustrates PTMP Deployment Topology, in accordance with embodiments.

The synchronized framed scheduling methods and systems, in accordance with embodiments, may be used in PTMP (point-to-multi-point) communication systems using multiple AP/BSs (e.g. similar to a cellular deployment) as illustrated in FIG. 7A. Specifically, FIG. 7A shows a PTMP deployment topology network 700, in accordance with embodiments, including units A and B which function as AP/BS, while units A1, A2, . . . An and units B1, B2, . . . Bk function as STAs (e.g. stations or end devices).

In accordance with embodiments, Units A and B are connected/in communication to/with one or more Synchronization Sources 708 such as GPS used for time synchronization.

Specifically, in accordance with embodiments, the network may be a IEEE 802.11 orthogonal frequency division multiple access (OFDMA) based wireless communication network, and the APs such as AP A and AP B are IEEE 802.11 OFDMA based Access Points (APs) and the one or more STAs are IEEE 802.11 OFDMA (STAs), wherein each AP has its associated STAs in the PTMP topology.

A STA associated to an AP is a STA which have mutual context with the AP for example after passing an initial authentication context.

The STAs in FIG. 7A are associated respectively with units A and B via one or more wireless links 702 and 704. Since network 700 supports mobility each one of STAs (A1-An or B1-Bk) may roam between AP A and AP B. Typically, networks comprise many AP/BSs and each one of them may be in communication with many STAs.

Figure 7B:
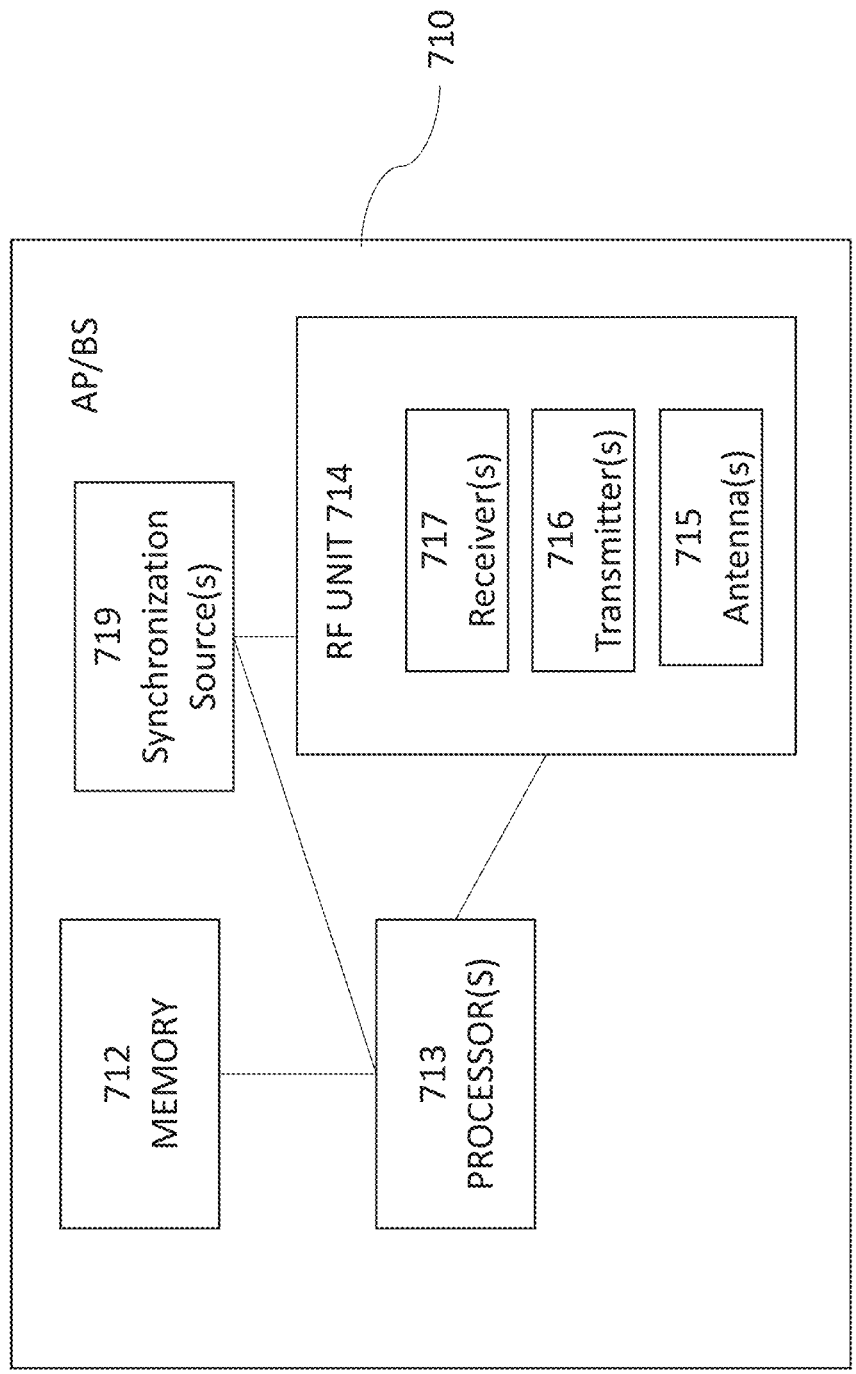
FIG. 7B is a block diagram of a device such as AP or Base Station, in accordance with embodiments.

FIG. 7B is a block diagram of a device such as AP 710 or Base Station, in accordance with embodiments.

In FIG. 7B, device 710 may include a memory 712, one or more processors such as processor 713, and one or more Radio Frequency (RF) units such as RF unit 714.

In some cases, the RF unit 714 may be in communication (e.g., connected) with the processor 713 and may transmit/receive, respectively, one or more radio signals via one or more RF antennas 715 using one or more Receivers 717 and/or Transmitters 716. The RF unit 714 may transmit the signals by for example up-converting data received from processor 713 to a transmission/reception band.

In accordance with embodiments, the one or more Synchronization Sources 708 may be in communication (e.g. wireless/wire communication) with the RF Unit 714 and/or the Processor 713. In some cases, the Synchronization Sources 708 may be a GPS used for time synchronization.

In some cases, the RF unit 714 may include one or more transceivers configured and enabled to transmit and/or receive RF signals from/to device 710.

In accordance with embodiments, the one or more processors 713 may implement the physical layer and/or the MAC layer according, for example, to the IEEE 802.11/LTE system using for example the RF unit 714. The processor 713 may be constructed to perform one or more operations according to the various embodiments of the present invention and according to the drawings and description. In addition, the module or methods for implementing the operation of the device 710 according to the various embodiments of the present invention described herein above and below may be stored in memory 712 and executed by processor 713.

In accordance with embodiments, the processor 713 is configured and enabled to control the transceiver and/or the one or more transmitters 716 and receivers 717.

In some cases, memory 712 may be connected to processor 713, and may store various types of information for execution by processor 713. In some cases, memory 712 may be included in processor 713 or installed exterior to processor 713, and/or may be connected to processor 713 by well-known means.

In some cases, device 710 may include single or multiple antennas.

Figure 7C:
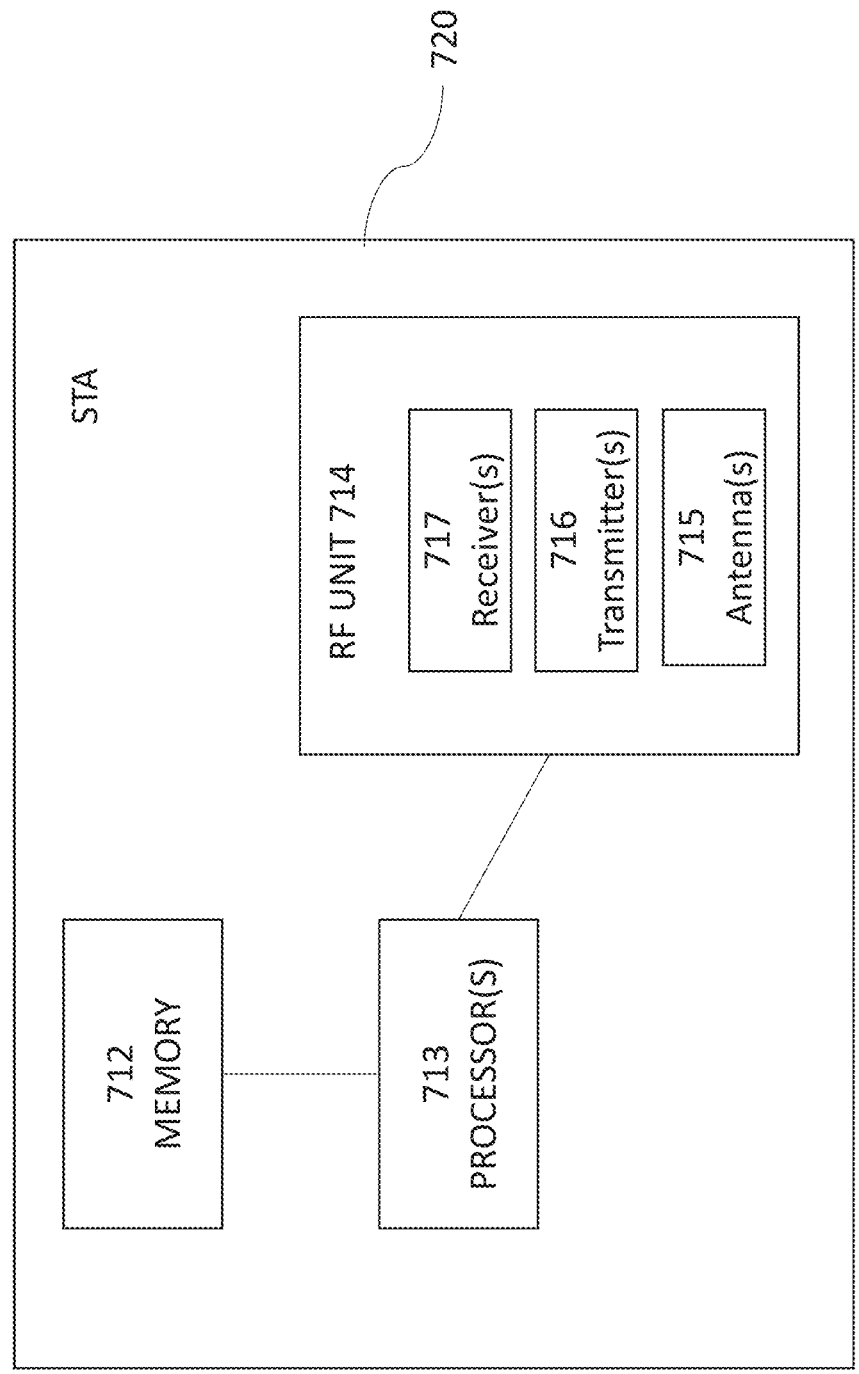
FIG. 7C is a block diagram of a device such as STA, in accordance with embodiments.

FIG. 7C is a block diagram of a device such as STA 720, in accordance with embodiments.

STA 720 may include all or some of the elements of AP 710 excluding for example the synchronization source 708.

There is provided in accordance with embodiments scheduling methods and systems (e.g. synchronized framed scheduling methods and systems) for scheduling downlink (DL) and/or uplink (UL) transmissions between one or more access points (APs) and a plurality of stations (STAs) in 802.11 orthogonal frequency division multiple access (OFDMA) wireless communication system such as the PTMP deployment topology network 700 of FIG. 7A.

Figure 8:
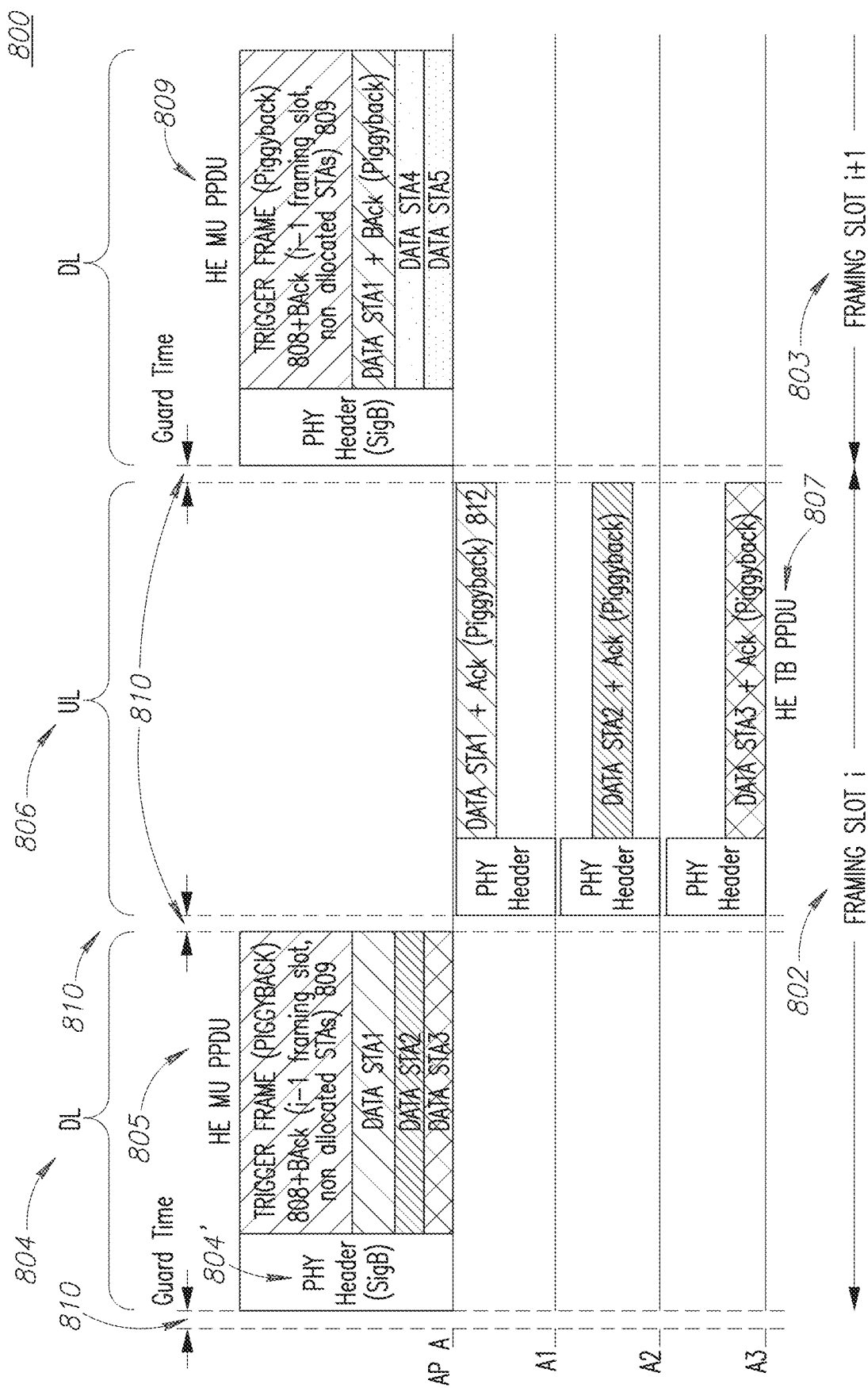
FIG. 8 illustrates Framing Slot structure, in accordance with embodiments.
Figure 10:
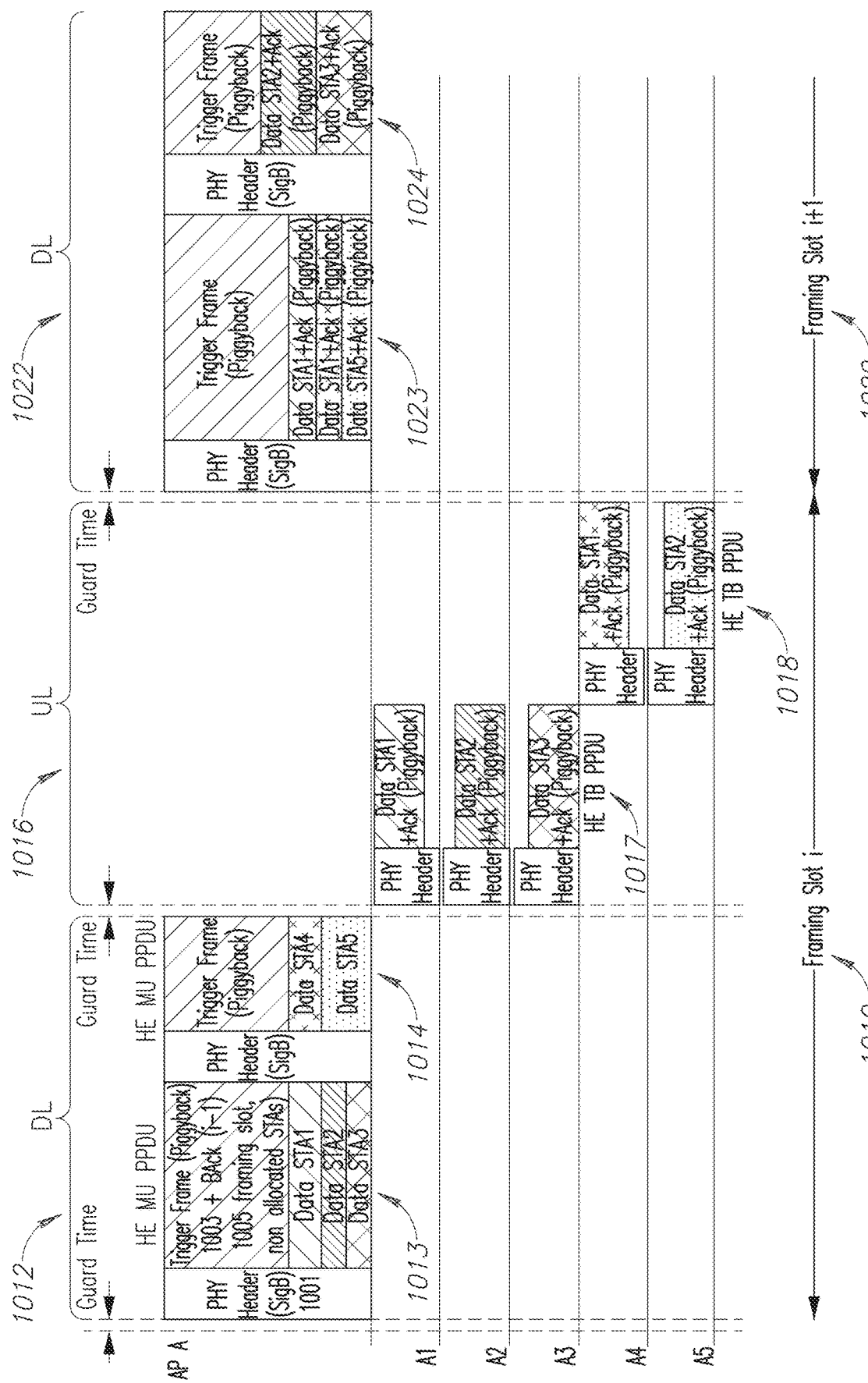
FIG. 10 illustrates a Framing Slot comprising Multiple PPDUs, in accordance with embodiments.

The scheduling methods and systems, shown for example in FIG. 8 and FIG. 10 in accordance with embodiments, leverage 802.11 OFDMA-based PHY structure. 802.11 OFDMA-based PHY assigns resource allocation in the frequency domain enabling AP to communicate with multiple STAs using for example a single burst transmission (HE MU-PPDU) in DL. In the UL direction, multiple STAs transmit HE TB-PPDU bursts using triggering instructions provided by the AP. In contrast, previous IEEE 802.11 OFDM-based PHY STAs are limited to time-domain only and enable AP to communicate with just a single STA in DL and/or UL directions. The scheduling methods and systems of the present invention may be used in OFDMA-based PHY structure as specified in IEEE 802.11ax and following revisions.

The scheduling methods and systems, in accordance with embodiments, are configured and enabled to provide one or more or a combination of the following capabilities (which for example may not be provided by prior schedulers such as CSMA/CA schedulers as used by standard 802.11 systems):

Simultaneous switching between downlink and uplink transmission for TDD communication between all or some AP/BSs in the same network to avoid self-interference. To support such capability the AP/BSs (e.g. all AP/BSs), in accordance with embodiments, are synchronized between them using for example a clock, e.g. same clock source (e.g. GPS receiver, IEEE1588);

Massive communication—serving large areas with hundreds of devices per sqkm in a cellular manner;

Enabling latency sensitive applications in the range of a few milliseconds. Such capability is enabled and improved once the scheduling has synchronized framing and known time slots for critical data transmission;

Fast roaming with no packet loss and very short disconnect time;

Reducing overhead (while prior 802.11 CSMA/CA mechanism (as illustrated in FIG. 1) causes high overhead when many radios try to communicate with one another).

Using limited spectrum resources, by lowering Reuse Factor (e.g. Reuse Factor of One).

The configurations disclosed herein can be combined in one or more of many ways to provide improved methods and systems enabling synchronized framed scheduling for 802.11 standards such as the latest 802.11ax standard.

In some embodiments, the methods and systems for enabling synchronized framed scheduling may include providing a scheduling method and system (e.g., synchronized framed scheduling) that is configured and enabled to generate predefined Framing Slots.

Advantageously, the IEEE 802.11 OFDMA scheduling methods and systems in accordance with embodiments are configured and enabled to yield radio capabilities equivalent to 5G NR (5G New Radio) systems.

Additionally, the IEEE 802.11 OFDMA scheduling methods and systems in accordance with embodiments include natural synchronized OFDMA based framing structure.

Specifically, there is a fundamental difference between 3GPP 4G/5G NR (5G New Radio) OFDMA radio technology systems and methods such as LTE, and the synchronized 802.11 scheduling of the present invention. 5G NR comprise framed structure dividing the time domain into slots. Each slot includes 14 OFDM symbols creating a continuous time and frequency domains grid, where all control and synchronization signals are mapped into designated Resource Elements (RE) as specified in 3GPP. In contrast, the 802.11 OFDMA-based framed structure in accordance with embodiments, comprises burst transmissions inserted into fixed time periods for either DL and/or UL directions.

Each Data Unit burst transmission includes its own synchronization signals (e.g. Timestamp) and allows the receiver to adjust its clock. Accordingly, it allows AP and STAs to send and receive the bursts within specific timings as described herein and below with respect to FIG. 8 and FIG. 10.

One or more components of the configurations disclosed herein can be combined with each other in many ways.

FIG. 8 shows a Framing Slot structure and scheduling method and system 800 for OFDMA based wireless systems such as IEEE 802.11 standard, in accordance with embodiments.

As shown in FIG. 8, each network may comprise an access point (AP) and a plurality of stations (e.g. STAs A1, A2 . . . An) in 802.11 OFDMA wireless communication system.

In accordance with embodiments, the AP synchronizes the plurality of STAs within each network using one or more synchronization signals over the air (e.g. using Timestamps) delivered between the AP and the STAs.

The method includes allocating one or more Framing Slots, such as Framing Slot 802 and Framing Slot 803. Each Framing Slot (e.g. Framing Slot i, Framing Slot i+1 . . . ), comprises a fixed time duration (e.g. 2 msec).

In some cases, the Framing Slot's time duration may vary per traffic characteristics (e.g. latency, throughput, etc.).

In accordance with embodiments, each Framing Slot such as Framing Slot 802 comprises DL and UL transmission periods 804 and 806. Per each Framing Slot, the AP (e.g. AP A) may transmit datagrams (e.g. Data STA1, Data STA A2, Data STA3) to multiple STAs (e.g. A1, A2, A3) using for example one or more Data Units such as Data Units 805 (e.g. HE MU-PPDU 802.11 frame) in the DL direction.

The Framing Slot structure, further defines, in accordance with embodiments, a piggyback mechanism, where part of RUs is used for Trigger Frame 808 for UL RU allocation and part of RUs is used for Block Ack messages 809 for previous Framing Slots for non-allocated STAs (e.g. STA 4 and 5).

As shown in FIG. 8, each Framing Slot is numbered 0, 1, . . . i, i+1 and Guard Time intervals 810 are included between each DL and UL transmission to compensate on the two-way signal propagation time over the air between AP and associated STAs.

In accordance with embodiments, the defined allocations, such as Framing Slot 802, include a number of time slots in which each time slot is scheduled as follows:

DL (downlink) transmission period 804—transmitted BS/AP A and received by STAs A1, A2 . . . An;

UL (uplink) transmission period 806—transmitted by STAs A1, A2, . . . An and received by BS/AP A;

Guard Periods 810 between DL and UL transmissions.

In accordance with embodiments, the DL and UL transmission periods such as DL and UL transmission periods 804 and 806 included in the Framing Slot 802 may have different time durations and the duration ratio between them defines TDD split. Advantageously, by using different DL and UL durations the network system may provide DL and UL or symmetric oriented services. In other words, the synchronized scheduling method and system in accordance with embodiments provide managed DL and UL with continuous behavior, hence, bursts (such as Data Units 805 and 807) are transmitted continually one burst following the previous burst, while prior 802.11 schedulers provide opportunistic (e.g. not managed and not continuous) DL and UL scheduling transmissions opportunities.

Specifically, the framing structure as described in accordance with embodiments includes one or more DL transmission bursts such as DL Data Unit 805 (e.g. HE MU-PPDU) during the fixed-time DL period 804 and UL transmission bursts such as UL Data Unit 807 (e.g. HE TB PPDU) during fixed-time UL period 806.

In the DL transmission period 804, the first burst is transmitted by AP at the beginning of each Framing Slot. If more than one DL burst is transmitted during the DL period (as illustrated for example in FIG. 10) the following DL bursts are transmitted with a time offset from the beginning of the Framing Slot as per AP scheduling decision. The total time for all DL burst transmissions will not exceed the fixed-time DL period, e.g. time DL period 804.

In the UL transmission period 806, the STAs transmit to the AP a first burst (Data Unit 807 such as HE TB PPDU) at the beginning of the UL period within the Framing Slot 802. If more than one UL burst is transmitted by another set of STAs within the UL period of the Framing Slot (as illustrated in FIG. 10), these bursts should be transmitted with time-offset from the beginning of the UL period as indicated by AP to the STAs during the DL period. The total time for all UL burst transmissions will not exceed the fixed-time UL period.

In accordance with embodiments, within the continuous synchronized behavior of the scheduling, the fixed-time Framing Slots are transmitted constantly, while AP and STAs are completely synchronized one with the other on the same transmission timings, transmission durations and numbering sequence of the Framing Slots.

More specifically, as illustrated in FIG. 8, a set of functionalities per each Framing Slot are defined as follows, in accordance with embodiments:

DL resource scheduling—the DL RU allocations for the associated STAs are signaled by BS/AP A in the SigB field, which is included for example in the PHY header 804' of data unit 805 (e.g., HE MU-PPDU according for example to 802.11ax amendment protocol).

UL resources scheduling—the BS/AP A informs the STAs with RU allocation in UL direction using Trigger Framing message 808 (for example according to 802.11ax amendment). The Trigger Frame 808 is transmitted by BS/AP A as a broadcast/multicast message in one or more of DL Resource Units (RU). The Trigger Frame 808 includes an instruction to some or all STAs served in DL direction to enable Acknowledgement and UL data transmission, but also instructions to any STA associated to the AP/BS A for data transmission.

Acknowledgment for DL transmission—each DL transmission to STAs is acknowledged in the UL transmission of the same Framing Slot. In some cases, STAs use ACK and/or Block Ack messages such as ACK message 812 (according to 802.11ax amendment)

Acknowledgment for UL transmission—each UL transmission is acknowledged by BS/AP A in the DL transmission of the next Framing Slot. BS/AP uses ACK and/or Block Ack message (according to 802.11ax amendment). In some cases, the ACK and/or Block Ack messages are sent as broadcast/multicast in one of the Resource Units (RU) and in addition, the ACK/Block Ack messages can be sent in a unicast Resource Unit (RU) as a piggyback message with other data (as shown in FIG. 8).

UL Random access—Each Framing Slot may enable UL Random access for other STAs also using the Trigger Frame. Such capability is enabled using UORA (Uplink OFDMA Random Access) mechanism according to 802.11ax (and further illustrated in FIG. 9A and FIG. 9B). As shown in FIG. 8 the time duration of the DL and UL bursts transmissions are fixed time periods comprising a fixed time guard between the Framing Slots in each Framing Slot.

In accordance with embodiments, the Framing Slots are transmitted constantly one after another creating continuous synchronized communication between AP and STAs. Each Framing Slot is numbered with a time stamp, and AP and STAs are updated on each Framing Slot timing and sequence number.

A Group of Framing Slots generates a Multi-Frame as explained hereinafter with respect to FIG. 11A, FIG. 11B and FIG. 11C.

Figure 9A:
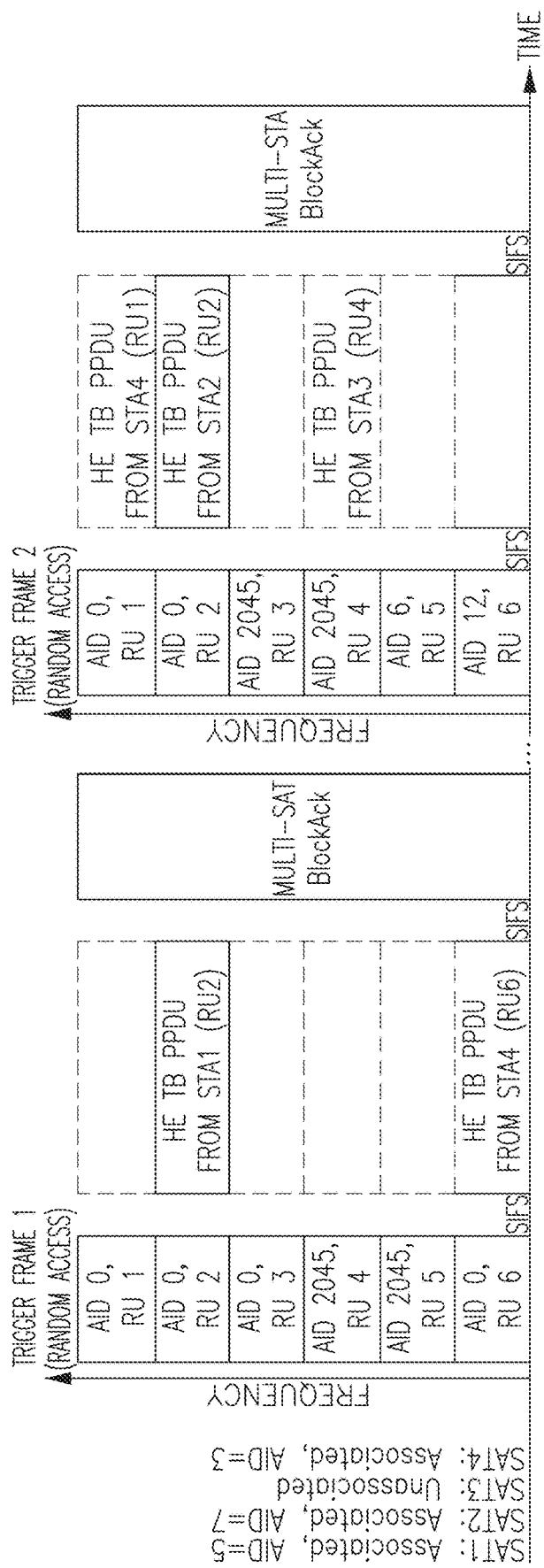
Figures 9B, 9C:
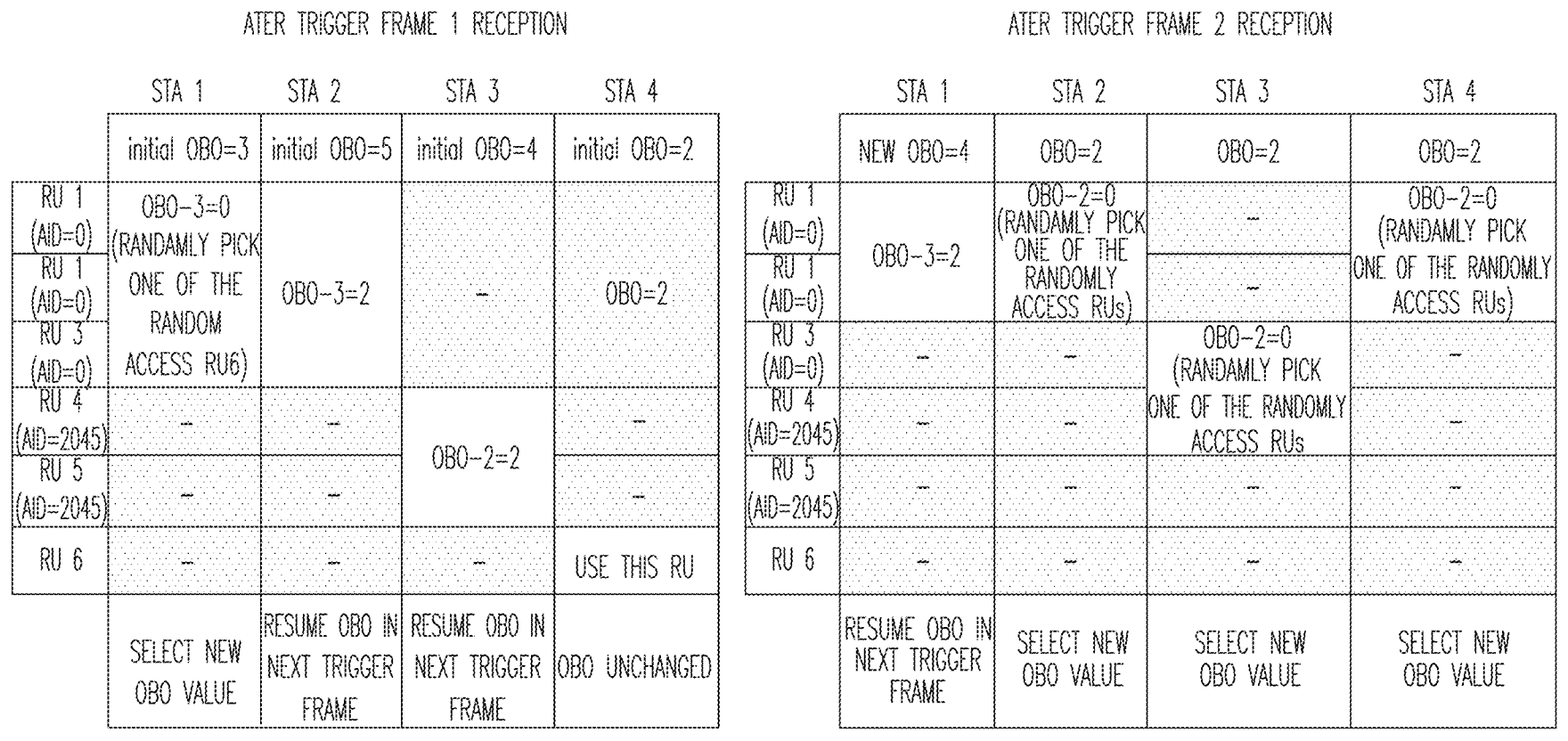

FIGS. 9A-9C show UORA (UL OFDMA Random Access) mechanism as specified by current 802.11ax standard. In accordance with embodiments, the usage of UORA mechanism using piggybacked Trigger Frame is to enable communication with any associated and non-associate STAs approaching AP.

In accordance with embodiments, each Framing Slot may support one or more Data Units (e.g. PPDU frames) per each DL transmission and each UL transmission. While FIG. 8 shows an example of a single Data Unit (e.g. PPDU frame) per DL transmission and UL transmission (for explanation simplicity), FIG. 10 shows an example including two Data Units in DL and two Data Units in UL per Framing Slot. The number and duration of Data Units in DL and UL slots can vary as long as the total time duration of data units is not exceeding the DL and UL time duration as set by TDD split in the system.

Specifically, as shown in FIG. 10, the systems and methods in accordance with embodiments may define scheduling methods and systems configured and enabled for transmitting/receiving multiple Data Units (such as 802.11ax HE MU-PPDU) per Framing Slot in each DL and UL direction.

For example, a number of Framing Slots, such as Framing Slot 1010 and Framing Slot 1020 having a fixed time duration may be allocated. Each Framing Slot such as Framing Slot 1010 includes a DL transmission period 1012 and UL transmission period 1016. In accordance with embodiments, the DL transmission period 1012 and UL transmission period 1016 comprise respectively one or more DL Data Unit bursts and one or more UL Data Unit bursts such as DL Data Unit bursts 1013 and 1014 (e.g. HE MU PPDU) and UL Data unit bursts 1017 and 1018 (e.g. HE TB PPDU).

In accordance with embodiments, each Data Unit Burst may have a different time length based on the AP scheduling decision, but the total time length of all transmission bursts cannot exceed the fixed DL period time. Additionally, in accordance with embodiments, different Data Units may allocate RU to a different set of Data Units, and/or the same STAs may belong to a different set of STAs. For example, STA1 may be in the first Data Unit 1013 and also in the second Data Unit 1014.

In accordance with embodiments, in operation AP, such AP A, transmits one or more DL Data Unit bursts (Data Units 1013 and 1014) to one or more STAs (STA1, STA2, STA3, TA4 and STA5) during DL transmission period 1012. Each DL Data Unit burst comprises:

- PHY header such as header 1001 comprising scheduling instructions to allocate one or more (for example a set) of RUs (Resource Units) to one or more STAs such as predefined STAs;
- MAC and Data are allocated in the assigned RUs per set of STAs as indicated in the PHY header of Data Units;
- Trigger Frame 1003 (such as 802.11 Trigger Frame) included in one or more Data Units bursts during DL transmission. The Trigger Frame includes UL transmission instructions to STAs during the Framing Slot (the instructions are detailed below with respect to the UL transmission period). In accordance with embodiments, the AP (such as AP A) may send one or more Trigger Frames within Data Units according to the Quality of Service scheduling decision (e.g. resulting from strict latency requirements). It is noted that the trigger frame may be allocated in any RU.
- 802.11 Block Ack (Block Ack 1005) or Ack information is included in one or more DL Data Units bursts during DL transmission. Block Ack or Ack information is sent to indicate STAs for the reception of UL data transmission during the previous Framing Slot.

Accordingly, STAs, which are communicating with AP (Such AP A) and which received UL transmission instructions in Trigger Frame during the DL transmission period send UL Data Unit Bursts 1017 and 1018 (such as 802.11ax HE TB-PPDU) during the UL transmission period (e.g. UL transmission period 1016) as allocated in accordance with embodiments, as follows:

- Each UL transmission period (e.g. UL transmission period 1016) may include one or more Data Unit bursts (e.g. TB-PPDU transmission periods) such as Data Unit bursts 1017 and 1018. AP may instruct the STAs to transmit their Data Units (TB-PPDU) in designated time during the UL transmission period.
- The complete time length of all related UL Data Units bursts transmissions with different timings do not exceed the total UL transmission period.
- Each UL Data Unit burst comprises:
  - DL Trigger Frame information comprising a PHY header instruction for each Data Unit to allocate RUs per STA and a time-start pointer (e.g. using for example offset time from the beginning of the UL transmission period) for the Data Unit (TB-PPDU burs)t to be transmitted.
  - Each STA when sending Data Unit burst (e.g. TB-PPDU) may comprise 802.11 BAck information (e.g. 802.11 Block Ack information) indicating the AP with the reception of DL data within Data Unit burst (e.g. MU-PPDU) during the DL transmission period of the same Framing Slot.

It is noted that though FIG. 10 presents an example of two Data Units (e.g. two PPDUs) per Framing Slot, the systems, devices and methods, in accordance with embodiments, may include any combination of Data Units per Framing Slot. The Data Units time duration can vary, but is limited to the DL and UL periods, which are fixed in the synchronized network.

Multi-Frame

In accordance with another embodiment, there is provided a Multi-Frame for OFDMA based wireless systems such as IEEE 802.11 standard for wireless local-area networks. The Multi-Frame comprises multiple Framing Slots, for example, a predefined group of Framing Slots.

According to some embodiments, the Multi-Frame comprises consequent Framing Slots, where AP and STAs are synchronized, respectively, one with the others by having common (e.g. same) timing to identify the beginning and end of the Multi-Frame. Additionally, AP and STAs are both synchronized one with the others with shared Framing Slot ordering and numbering within the Multi-Frame.

In accordance with embodiments, in the wireless local-area networks one or more Multi-Frames may be transmitted continuously one after the other.

In some cases, one, some, or all Framing Slots of the Multi-Frame may be the Framing Slot 802 shown in FIG. 8 or Framing Slot 1010 shown in FIG. 10.

In accordance with embodiments, the numbering of Framing Slots is circulated per Multi-Frame size.

FIG. 11A shows, in accordance with embodiments, a plurality of Multi-Frames 1101 (e.g. Multi Frame i, Multi Frame i+1) and Multi Frame structure, in accordance with embodiments.

Each Multi-Frame may comprise for example 16 Framing Slots. It is stressed that the Multi-Frame structure may include any number of Framing Slots, for example, more or less than 16 Framing Slots.

According to one embodiment, one or more of the Framing Slots of each Multi-Frame may be used as Maintenance Framing Slot such as Framing Slot 1110 and 1110' (slot numbered '0'). Preferably, the Maintenance Framing Slot time duration is equivalent to each of the other fixed Frame Slots (slots '1'-'15') time duration in the Multi-Frame. In the example shown in FIG. 11A the time duration of the Maintenance Framing Slot 1110 and other Framing Slots is the same.

In the example shown in FIG. 11A, the Maintenance Framing Slot 1110 is numbered '0' and located at the beginning of Multi-Frame 1100.

In accordance with some embodiments, the Multi-Frame 1100 total time duration and number of Framing Slots may vary between different Multi-Frames, hence, the time duration of a Multi-Frame is determined according to the number of Framing Slots in the Multi-Frame and time duration of each Framing Slot.

In some cases, the Multi-Frame duration can be broadcasted by AP to all STAs by the Maintenance Framing Slot 1110 in a Multi-Frame for the following Multi-Frames to synchronize Framing Slot sequence (e.g. numbering) between AP and STAs.

FIG. 11B shows a Maintenance Framing Slot 1112 (in Synchronous Mode) comprising Long BF Training and FIG. 11C shows a Maintenance Framing Slot (Synchronous Mode) 1122 w/o BF Training. The Maintenance Framing Slot 1112 may comprise, in accordance with embodiments, a Beacon message 1113 for broadcasting specific network information as described hereinbelow and optionally also Beamforming Training procedure. When no Beamforming training procedure exists, the Maintenance Slot 1112 includes DL and UL PPDU following the Beacon message.

In FIG. 11B the numbering in the Maintenance Framing Slot 1112 relates to the typical OFDM symbols numbers needed to transmit DL broadcast message (e.g. Beacon message) and Beamforming training messages sequence.

The Multi-Frame structure, in accordance with embodiments, supports the following capabilities:

Each Multi-Frame has one (or more) Maintenance Framing Slot and the other frames are regular Framing Slots. A Regular Framing Slot may be defined as a Framing Slot for DL and UL transmissions between AP and STAs, such as Framing Slot 802 or Framing Slot 1010 as shown, respectively, in FIG. 8 and FIG. 10.

Each Framing Slot is numbered. In the synchronized network all or some of the Framing Slot numbers should be the same for the APs (e.g. all APs) and STAs when transmitted over the air. The numbering can be derived from the Timestamp transmitted in each PPDU. Using Timestamp in each PPDU enables any STA/device (associated and new ones) to be synchronized to the Framing Slot numbering in the Multi-Frame within the network. Such synchronization enables the STA to calculate the Maintenance Framing Slot or any other Framing Slot timing in advance. Such mechanism is useful for efficient scanning period selection and other processes.

Maintenance Framing Slot

Maintenance Framing Slot is used, in accordance with embodiments, by the AP/BST for the Framing Slot scheduling profile announcement (e.g. per following Multi-Frame) and other 802.11 broadcasting information (such as SSID (Service Set Identifier) broadcasting in according to 802.11). Such announcements can be broadcasted using for example 802.11 Beacon message.

The Framing Slot scheduling profile information includes (but not limited to), in accordance with embodiments:

Framing Slot time duration—the time duration of a single Framing Slot in one Multi-Frame can be different from the time duration of a single Framing Slot in other Multi-Frames. For example, for low latency service the Framing Slot can be short (e.g. 1 msec) and for more throughput demanded traffic the Framing Slot may have longer duration (e.g. 5 msec);

Number of Framing Slots per Multi-Frame- to enable different dynamic behavior of traffic and wireless networking changes. For example, in case of static behavior of the traffic and wireless system, the Multi-Frame may include longer periods, but in case of higher dynamicity in traffic changes or wireless user behavior (e.g. mobility) the system may define shorter Multi-Frame duration (meaning less Framing Slots per Multi-Frame);

TDD Split (DL and UL duration periods);

Maintenance Slot periodicity (or Beacon periodicity);

Beamforming training periodicity (as further explained below);

Others: for example, scanning opportunities for Neighboring APs (mobility preparation process).

Figure 12:
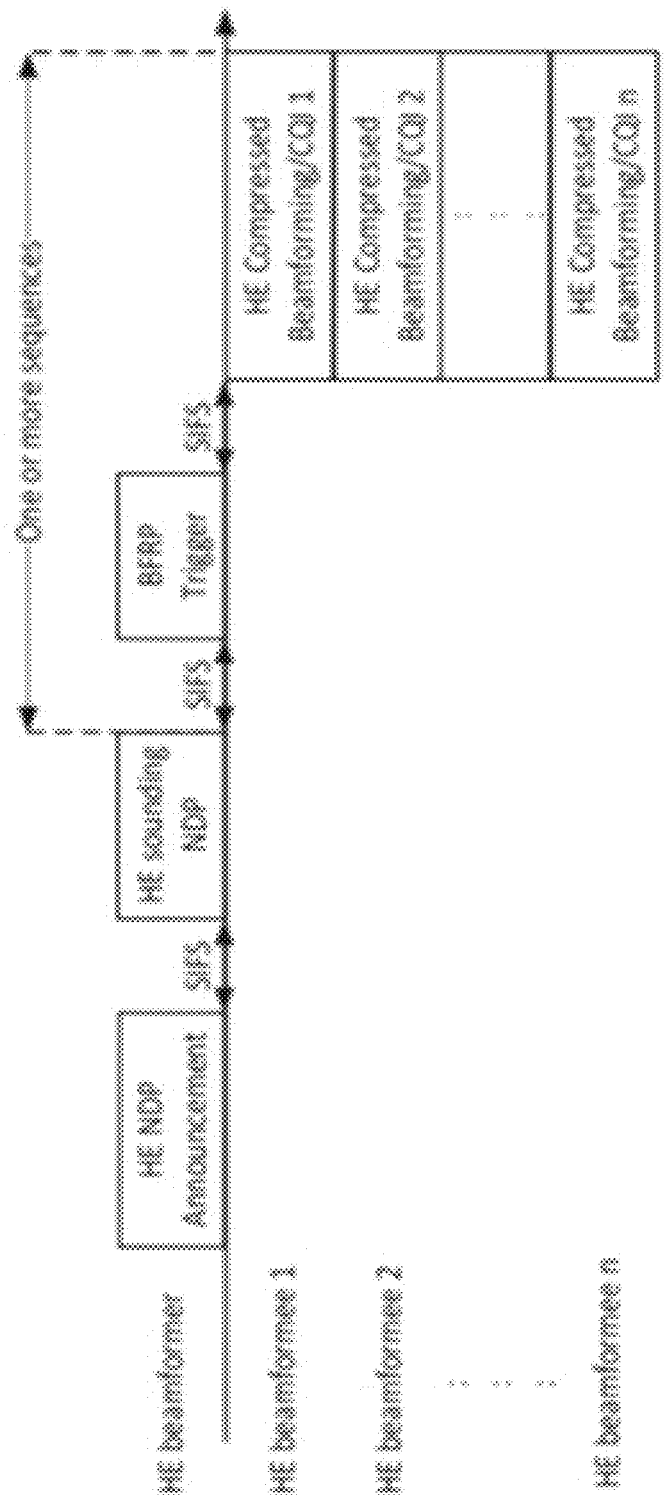
FIG. 12 shows an 802.11ax Beam Forming Training Procedure, in accordance with the prior art.

FIG. 12 shows the Beamforming training procedure as specified in 802.11ax. Such procedure may be included in the Maintenance Framing Slot as shown in FIG. 11B and FIG. 11C.

Beamforming (BF) Training—the 802.11ax defines procedure for BF training as shown in FIG. 12. The Maintenance Framing Slot can be used for such procedure, while AP (HE beamformer) and associated STAs (HE beamformee) may use calculated beamforming matrixes until the next Beamforming Training procedure. In a synchronized framed scheduling, in accordance with embodiments, the nodes (STAs) are aware of the following beamforming procedure and therefore AP may enable more optimized beamforming training procedure vs opportunistic scheduler.

According to one embodiment, the Maintenance Framing Slot structure as shown in FIG. 11B may be divided to transmission bursts (based on the typical OFDM symbols numbering) as follows:

Transmission burst 1, symbols 0-7: Beacon (HE SU PPDU)+SIFS (Short InterFrame Space timer)

Transmission burst 2, symbols 8-10: NDP-A (Null Data Packet Announcement)+SIFS

Transmission burst 3, symbols 11-13: NDP+SIFS

Transmission burst 4, symbols 14-61: CQI (Channel Quality Indicator) (/Beamforming Report (file size based on various parameters)—this is the longest version Transmission burst 5, symbol 62: Gap According to one embodiment, the Maintenance Framing Slot structure as shown in FIG. 11C may be divided to transmission bursts (based on the typical OFDM symbols numbering) as follows:

Transmission burst 1, symbols 0-7: Beacon (HE SU PPDU)+FIPS

Transmission burst 2, symbols 8-10: PHY Header

Transmission burst 3, symbols 11-30: DL HE MU PPDU (Data)+Block Ack for previous Framing Slot (UL A-MSDU (Aggregated-MAC Packet Data Unit (includes MAC Header+Data))+Trigger Frame (UL RU allocation)

Transmission burst 4, symbols 31: Gap

Transmission burst 5, symbols 35-34: PHY Header

Transmission burst 6, symbols 32-61: UL HE TB PPDU (Data)+Block Ack (for DL A-MSDU)

Transmission burst 7, symbol 62: Gap

In accordance with some embodiments, the structure of the Maintenance Framing Slot is mandatory however the number of symbols per each OFDM burst can vary.

Semi-Synchronous Multi-Frame Structure

According to another embodiments, there is provided a Semi-Synchronous Multi-Frame structure which is a subset of the fully synchronous Framing Scheduler. The Semi-Synchronous Multi-Frame structure may be applicable for small networks (limited number of APs per network), where DL and UL transmission synchronization is not essential for inter-cell interference avoidance. Such deployment does not require a synchronization source (like as GPS or IEEE 1588). Another advantage of the Semi-Synchronous Multi-Frame structure is R&D implementation simplicity, where most of standard 802.11ax procedures can be used as is.

This approach enables using CSMA/CA combined with the Multi-Frame structure as illustrated hereinabove with respect to FIG. 8 and FIG. 10. The Semi-Synchronous Multi-Frame structure is suitable for example for unlicensed bands, where regulation requires LBT.

Figure 13:
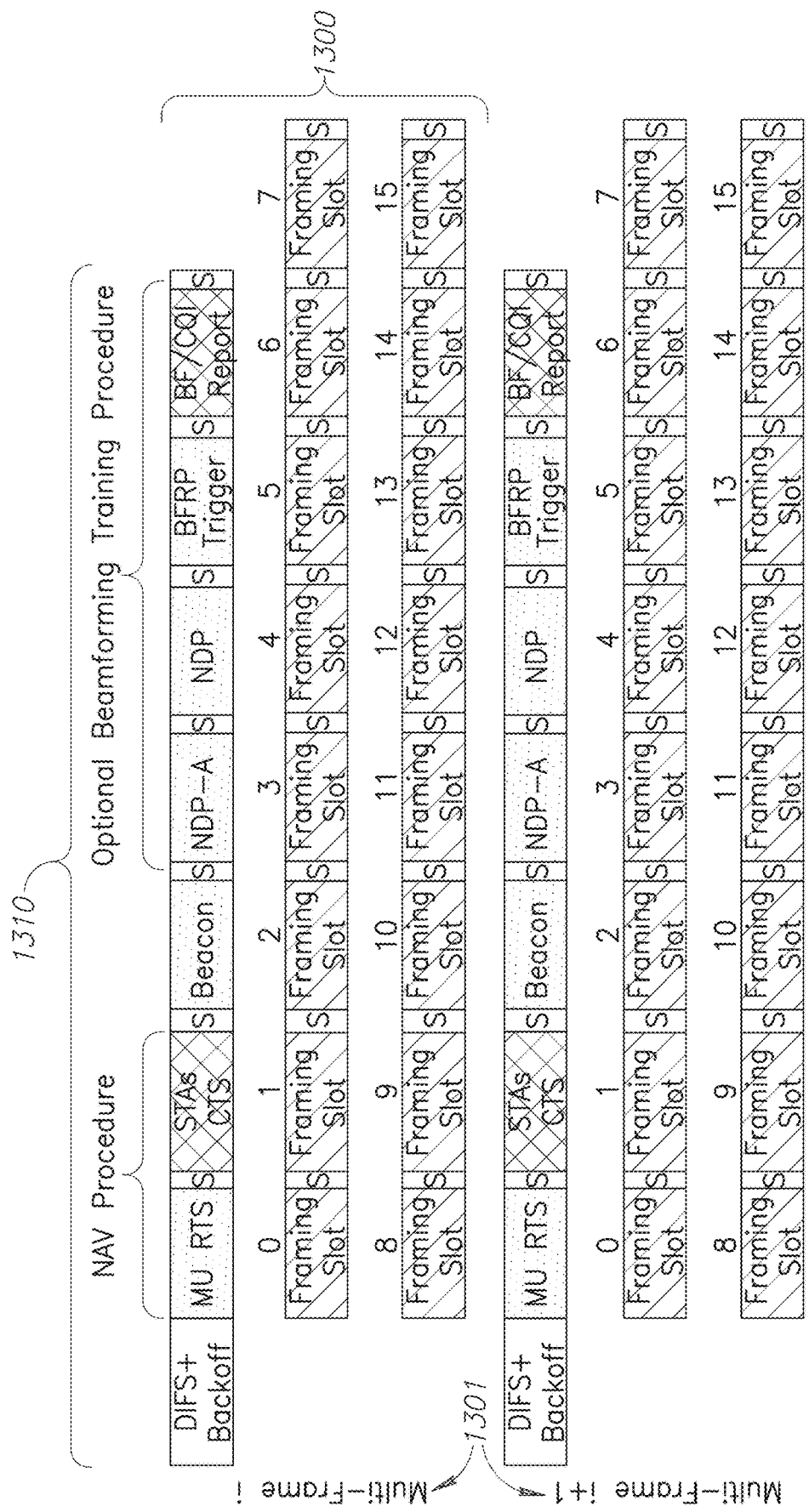
FIG. 13 shows a Semi-Synchronous Multi-Frame Structure, in accordance with embodiments.

FIG. 13 shows a plurality of Multi-Frames 1301 and a Multi-Frame structure 1300 for non-synchronized network, in accordance with embodiments. The Multi-Frame structure 1300 includes Maintenance Framing Slot 1310, which don't have a fixed time i.e. Maintenance Framing Slot 1310 may have different time durations than the other fixed time/regular Framing Slots (slots '0'-'15') and therefore must be transmitted before the regular Framing Slots are performed. Since this structure is not network synchronized it may include CSMA/CA timers (e.g. DIFS and Backoff) prior to any Multi-Frame. This Multi-Frame structure enables using NAV mechanism as defined in 802.11 using MU RTS/CTS messages and TXOP field.

The Maintenance Framing Slot 1310 includes:
NAV Procedure;
Broadcast Announcement (e.g. Beacon);
Optionally, Beamforming procedure.

The Semi-synchronized scheduler according to embodiments has the following functionalities which are not part of a synchronized scheduling methods and systems:

Using SIFS timer between each PPDU frame;
No piggyback for Trigger Frame and Ack/Block Ack is required. In other words, such frames can be sent as dedicated PPDUs according to 802.11ax and shown in FIG. 14;
Maintenance Framing Slot may have variable duration vs fixed duration in synchronized scheduling methods;
Using NAV (Network Allocation Vector) 802.11 mechanism to occupy the air resource during Multi-Frame period (using 802.11 RTS/CTS mechanism); and
Using 802.11 DIFS and Contention Window (Backoff) mechanism between Multi-Frames.

Figure 14:
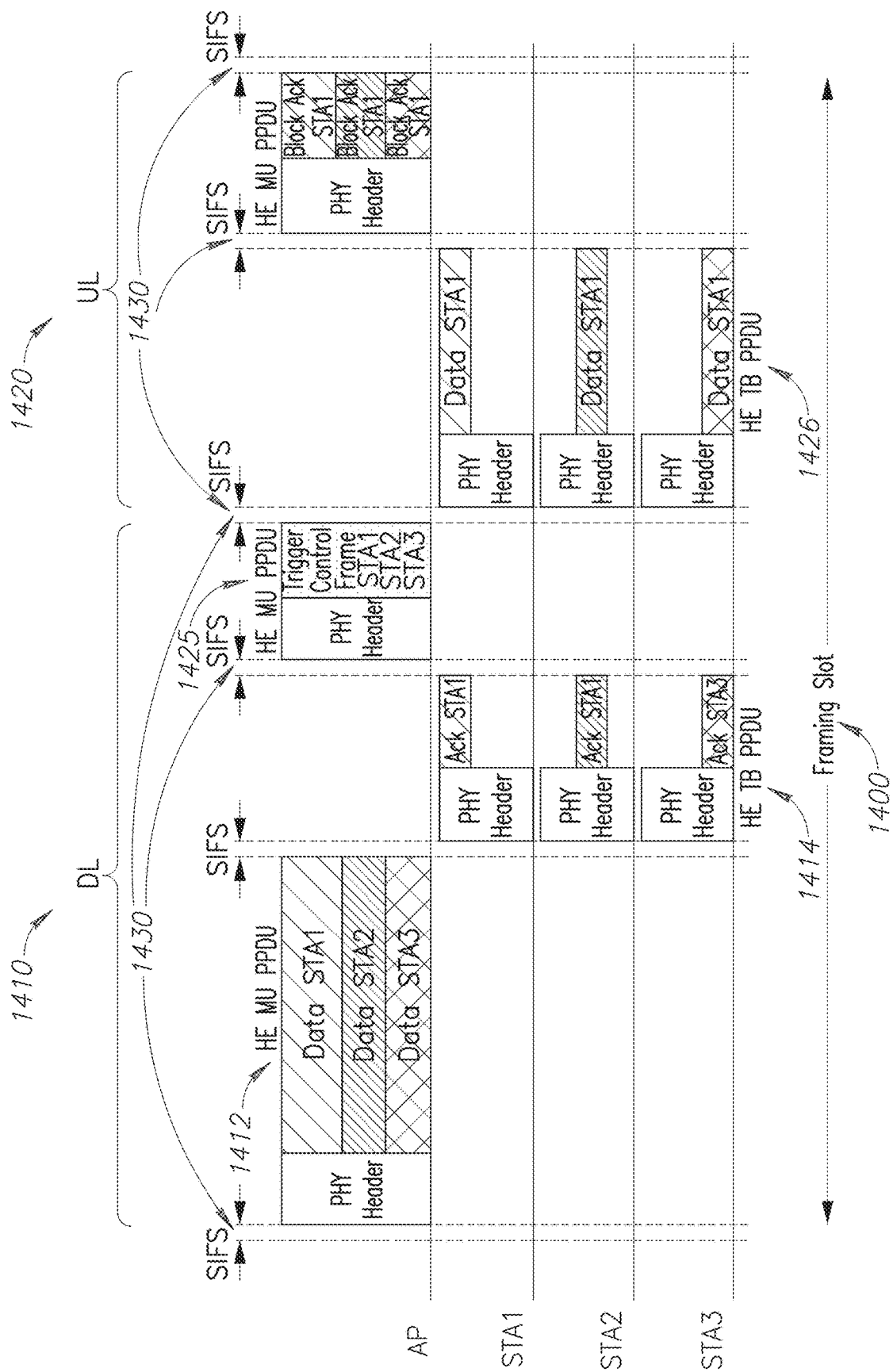
FIG. 14 shows a Framing Slot w/o Piggyback for Semi-Synchronous Framing Scheduling, in accordance with embodiments of the present invention.

FIG. 14 shows an example of a Framing Slot 1400, which can be used for Semi-Synchronous Multi-Frame procedure, for OFDMA based wireless systems such as IEEE 802.11 standard, in accordance with embodiments. The Framing Slot 1400 may reuse the procedures as defined in 802.11ax and shown in FIG. 5.

The Framing Slot 1400 for semi-synchronized scheduler comprises, in accordance with embodiments, DL and UL procedures—DL procedure 1410 includes Data Unit 1412 (e.g. HE MU-PPDU) signaled by AP toward STAs and in response an acknowledgment message Data unit 1414 (ACK/Block Ack in HE TB PPDU) from STAs toward AP. UL procedure 1420 includes Trigger Frame 1425 sent by AP toward STAs in order to instruct and synchronize regarding simultaneous UL transmission from STAs. Following Trigger Frame 1425, the STAs send Data Units 1426 (e.g. HE TB-PPDU) toward AP. At the end of the Framing Slot 1400, AP responds with an acknowledgment (Block ACK) toward STAs. Each duration of DL and UL procedures can vary in time, however, in accordance with embodiments, the combined DL and UL procedures within the Framing Slot are fixed in time (e.g. 2 msec) and predefined.

In some cases, the semi-synchronous Framing Slot 1400 may include using piggyback approach for Trigger Frame and acknowledgment information as defined for Synchronized Framing Slot as shown in FIG. 8 and FIG. 10, however, between each 802.11 PPDU the system should keep SIFS 1430 timers and consider the SIFS periods as part of the semi-synchronized Framing Slot total duration.

It is stressed that the present invention refers to any OFDMA based systems and networks such as 802.11 standard releases for example 802.11ax.

In further embodiments, the processing unit may be a digital processing device including one or more hardware central processing units (CPU) that carry out the device's functions. In still further embodiments, the digital processing device further comprises an operating system configured to perform executable instructions. In some embodiments, the digital processing device is optionally connected to a computer network. In further embodiments, the digital processing device is optionally connected to the Internet such that it accesses the World Wide Web. In still further embodiments, the digital processing device is optionally connected to a cloud computing infrastructure. In other embodiments, the digital processing device is optionally connected to an intranet. In other embodiments, the digital processing device is optionally connected to a data storage device.

In accordance with the description herein, suitable digital processing devices include, by way of non-limiting examples, server computers, desktop computers, laptop computers, notebook computers, sub-notebook computers, netbook computers, netpad computers, set-top computers, handheld computers, Internet appliances, mobile smart-phones, tablet computers, personal digital assistants, video game consoles, and vehicles. Those of skill in the art will recognize that many smartphones are suitable for use in the system described herein. Those of skill in the art will also recognize that select televisions with optional computer network connectivity are suitable for use in the system described herein. Suitable tablet computers include those with booklet, slate, and convertible configurations, known to those of skill in the art.

In some embodiments, the digital processing device includes an operating system configured to perform executable instructions. The operating system is, for example, software, including programs and data, which manages the device's hardware and provides services for execution of applications.

In some embodiments, the device such as the AP/BST/STA includes a storage and/or memory device. The storage and/or memory device is one or more physical apparatuses used to store data or programs on a temporary or permanent basis. In some embodiments, the device is volatile memory and requires power to maintain stored information. In some embodiments, the device is non-volatile memory and retains stored information when the digital processing device is not powered. In further embodiments, the non-volatile memory comprises flash memory. In some embodiments, the non-volatile memory comprises dynamic random-access memory (DRAM). In some embodiments, the non-volatile memory comprises ferroelectric random access memory (FRAM). In some embodiments, the non-volatile memory comprises phase-change random access memory (PRAM). In other embodiments, the device is a storage device including, by way of non-limiting examples, flash memory devices, magnetic disk drives, magnetic tapes drives, optical disk drives, and cloud computing based storage. In further embodiments, the storage and/or memory device is a combination of devices such as those disclosed herein.

In some embodiments, the digital processing device includes an input device to receive information from a user. In some embodiments, the input device is a keyboard. In some embodiments, the input device is a pointing device including, by way of non-limiting examples, a mouse, trackball, track pad, joystick, game controller, or stylus. In some embodiments, the input device is a touch screen or a multi-touch screen. In other embodiments, the input device is a microphone to capture voice or other sound input. In other embodiments, the input device is a video camera to capture motion or visual input. In still further embodiments, the input device is a combination of devices such as those disclosed herein.

In some embodiments, the system disclosed herein includes one or more non-transitory computer readable storage media encoded with a program including instructions executable by the operating system of an optionally networked digital processing device. In further embodiments, a computer readable storage medium is a tangible component of a digital processing device. In still further embodiments, a computer readable storage medium is optionally removable from a digital processing device.

The functionality of the computer readable instructions may be combined or distributed as desired in various environments. In some embodiments, a computer program comprises one sequence of instructions. In some embodiments, a computer program comprises a plurality of sequences of instructions. In some embodiments, a computer program is provided from one location. In other embodiments, a computer program is provided from a plurality of locations. In various embodiments, a computer program includes one or more software modules. In various embodiments, a computer program includes, in part or in whole, one or more web applications, one or more mobile applications, one or more standalone applications, one or more web browser plug-ins, extensions, add-ins, or add-ons, or combinations thereof. In some embodiments, a computer program includes a mobile application provided to a mobile digital processing device. In some embodiments, the mobile application is provided to a mobile digital processing device at the time it is manufactured. In other embodiments, the mobile application is provided to a mobile digital processing device via the computer network described herein.

In some embodiments, the system disclosed herein includes software, server, and/or database modules, or use of the same. In view of the disclosure provided herein, software modules are created by techniques known to those of skill in the art using machines, software, and languages known to the art. The software modules disclosed herein are implemented in a multitude of ways. In various embodiments, a software module comprises a file, a section of code, a programming object, a programming structure, or combinations thereof. In further various embodiments, a software module comprises a plurality of files, a plurality of sections of code, a plurality of programming objects, a plurality of programming structures, or combinations thereof. In various embodiments, the one or more software modules comprise, by way of non-limiting examples, a web application, a mobile application, and a standalone application. In some embodiments, software modules are in one computer program or application. In other embodiments, software modules are in more than one computer program or application. In some embodiments, software modules are hosted on one machine. In other embodiments, software modules are hosted on more than one machine. In further embodiments, software modules are hosted on cloud computing platforms. In some embodiments, software modules are hosted on one or more machines in one location. In other embodiments, software modules are hosted on one or more machines in more than one location.

In some embodiments, the system disclosed herein includes one or more databases, or use of the same. In view of the disclosure provided herein, those of skill in the art will recognize that many databases are suitable for storage and retrieval of information as described herein. In various embodiments, suitable databases include, by way of non-limiting examples, relational databases, non-relational databases, object oriented databases, object databases, entity-relationship model databases, associative databases, and XML databases. In some embodiments, a database is internet-based. In further embodiments, a database is web-based. In still further embodiments, a database is cloud computing-based. In other embodiments, a database is based on one or more local computer storage devices.

In the above description, an embodiment is an example or implementation of the inventions. The various appearances of "one embodiment," "an embodiment" or "some embodiments" do not necessarily all refer to the same embodiments.

Although various features of the invention may be described in the context of a single embodiment, the features may also be provided separately or in any suitable combination. Conversely, although the invention may be described herein in the context of separate embodiments for clarity, the invention may also be implemented in a single embodiment.

Reference in the specification to "some embodiments", "an embodiment", "one embodiment" or "other embodiments" means that a particular feature, structure, or characteristic described in connection with the embodiments is included in at least some embodiments, but not necessarily all embodiments, of the inventions.

It is to be understood that the phraseology and terminology employed herein is not to be construed as limiting and are for descriptive purpose only.

The principles and uses of the teachings of the present invention may be better understood with reference to the accompanying description, figures and examples.

It is to be understood that the details set forth herein do not construe a limitation to an application of the invention.

Furthermore, it is to be understood that the invention can be carried out or practiced in various ways and that the invention can be implemented in embodiments other than the ones outlined in the description above.

It is to be understood that the terms "including", "comprising", "consisting" and grammatical variants thereof do not preclude the addition of one or more components, features, steps, or integers or groups thereof and that the terms are to be construed as specifying components, features, steps or integers.

If the specification or claims refer to "an additional" element, that does not preclude there being more than one of the additional element.

It is to be understood that where the claims or specification refer to "a" or "an" element, such reference is not be construed that there is only one of that element. It is to be understood that where the specification states that a component, feature, structure, or characteristic "may", "might", "can" or "could" be included, that particular component, feature, structure, or characteristic is not required to be included. Where applicable, although state diagrams, flow diagrams or both may be used to describe embodiments, the invention is not limited to those diagrams or to the corresponding descriptions. For example, flow need not move through each illustrated box or state, or in exactly the same order as illustrated and described. Methods of the present invention may be implemented by performing or completing manually, automatically, or a combination thereof, selected steps or tasks.

The descriptions, examples, methods and materials presented in the claims and the specification are not to be construed as limiting but rather as illustrative only. Meanings of technical and scientific terms used herein are to be commonly understood as by one of ordinary skill in the art to which the invention belongs, unless otherwise defined. The present invention may be implemented in the testing or practice with methods and materials equivalent or similar to those described herein.

While the invention has been described with respect to a limited number of embodiments, these should not be construed as limitations on the scope of the invention, but rather as exemplifications of some of the preferred embodiments. Other possible variations, modifications, and applications are also within the scope of the invention. Accordingly, the scope of the invention should not be limited by what has thus far been described, but by the appended claims and their legal equivalents.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention. To the extent that section headings are used, they should not be construed as necessarily limiting.

What is claimed is:

1. A method for scheduling downlink (DL) and uplink (UL) transmissions in one or more Point-to-Multipoint (PTMP) IEEE 802.11 orthogonal frequency division multiple access (OFDMA) based wireless communication networks, each network comprising one or more IEEE 802.11 OFDMA based Access Points (APs) wherein each AP of said one or more APs comprises associate one or more IEEE 802.11 OFDMA stations (STAs) (e.g. its associated BSTs), the method comprising the steps of:
   synchronizing the one or more STAs within each network using one or more synchronization signals transmitted between the one or more APs and the one or more STAs;
   allocating one or more Framing Slots, wherein each Framing Slot having a fixed time duration;
   dividing each Framing Slot of said one or more Framing Slots into DL burst transmission and UL burst transmission periods wherein the DL burst transmission periods comprise one or more DL Data Units Bursts and wherein each DL Data Unit Burst of said one or more DL Data Units Bursts comprises:
      DL PHY header comprising DL scheduling instructions to allocate one or more Resource Units (RUs) to said one or more STAs;
      DL MAC and Data as allocated in the allocated RUs per said one or more STAs as indicated in the DL PHY header;
      DL Trigger Frame comprising additional instructions for UL communication comprising RU allocation per said one or more STAs;
      Acknowledgment (Ack) or Block Acknowledgement (B Ack) for a UL data transmission from said one or more STAs transmitted during previous Framing Slots;
   and wherein the UL burst transmission periods comprise one or more UL Data Units Bursts, wherein each UL Data Unit Burst of said one or more UL Data Units Bursts comprises:
      UL PHY Header comprising parameters as received in the DL Trigger Frame;
      UL MAC Header and Data allocated in RU as received in the DL trigger frame;
      Acknowledgment or Block Acknowledgement for the DL Data Units Bursts transmitted in the same or previous Framing Slots;
   continuously scheduling by said one or more IEEE 802.11 OFDMA based APs the one or more DL Data Units Bursts during said DL transmission period to said one or more STAs; and
   continuously sending said one or more UL Data Unit Bursts by said one or more STAs to said respective one or more APs.

2. The method of claim 1 wherein the DL and UL burst transmission periods in the one or more Framing Slots have different time durations and wherein the time durations ratio between them defines TDD split.

3. The method of claim 1, wherein each of said UL Data Unit Bursts or said DL Data Unit Bursts may have different time length based on the one or more APs scheduling decision, and wherein the total time length of UL Data Unit Bursts cannot exceed the UL transmission period time and wherein the total time length of DL Data Unit Bursts cannot exceed the DL transmission period.

4. The method of claim 1, wherein said DL Data Unit Bursts or UL Data Unit Bursts comprises using PPDU 802.11 frames in the DL or UL direction.

5. The method of claim 1, comprising:
   communicating with any associated and non-associate STAs approaching said one or more APs using UORA (Uplink OFDMA Random Access) mechanism as in said DL Trigger Frame.

6. The method of claim 1, comprising allocating different RU of different STAs by different Data Units bursts.

7. The method of claim 1, comprising:
   generating one or more Multi-Frames, each said one or more Multi-Frames comprising a plurality of said one or more Framing Slots wherein each Framing Slot of said plurality Framing Slots is numbered and wherein one or more of said plurality Framing Slots is allocated as a Maintenance Framing Slot.

8. The method of claim 7 wherein said Maintenance Framing Slot comprising:
   information broadcasting, said information broadcasting comprises Framing Slot scheduling profile announcement per following Multi-Frame and beamforming training procedures within the Maintenance Framing Slot.

9. The method of claim 8, comprising:
   broadcasting the Multi-Frame duration by the one or more APs to the one or more STAs by the Maintenance Framing Slot to the following Multi-Frames to synchronize said Framing Slot sequence between the AP and STAs.

10. The method of claim 7, wherein the Maintenance Framing Slot comprises a Beacon message for broadcasting specific network information and optionally Beamforming Training procedure.

11. The method of claim 7 wherein the Framing Slot numbering is derived from a Timestamp transmitted in each Data Unit Burst.

12. The method of claim 7 wherein the Multi-Frame is a semi-synchronous Multi-Frame for scheduling the DL and UL transmissions between the one or more APs and the one or more STAs and wherein the semi-synchronous Multi-Frame is configured to synchronize between the one or more APs and associated one or more STAs, but not synchronize between the one or more APs within the same network.

13. A Multi-Frame structure for scheduling downlink (DL) and uplink (UL) transmissions between an access point (AP) and a plurality of stations (STAs) in an orthogonal frequency division multiple access (OFDMA) wireless communication system, the Multi-Frame structure comprising:
   multiple Framing Slots, wherein each of said multiple Framing Slots is numbered across the same synchronized network and wherein one of said multiple Framing Slots is allocated as a Maintenance Framing Slot, said Maintenance Framing Slot comprising:
   information broadcasting, said information broadcasting comprises Framing Slot scheduling profile announcement per following Multi-Frame and beamforming training procedures within the Maintenance Framing Slot.

14. The Multi-Frame structure of claim 13, wherein the Maintenance Framing Slot has the same time duration as each of the other Framing Slots or doesn't have the same time duration as the other Framing Slots.

15. An IEEE 802.11 OFDMA based Access Point (AP) for scheduling one or more Framing Slots between the AP and a plurality of stations (STAs) in an 802.11 orthogonal frequency division multiple access (OFDMA) based wireless communication network, said AP comprising:
- at least one synchronization source for time synchronization in said OFDMA wireless communication system;
- at least one transceiver used to transmit or receive wireless signals; and
- at least one processor in communication with said at least one transceiver, said processor is used to control the transceiver and wherein the processor comprises instructions to:
- synchronize the plurality of STAs within the network using one or more synchronization signals over the air transmitted between the AP and the plurality of STAs;
- allocate the one or more Framing Slots, wherein each Framing Slot of said plurality of Framing Slots having a fixed time duration, and wherein each Framing Slot of the one or more Framing Slots is divided into DL burst transmission and UL burst transmission periods, wherein the DL burst transmission period comprises one or more DL Data Units Bursts and wherein each DL Data Unit of said one or more DL Data Units Bursts comprises:
- DL PHY header comprising DL scheduling instructions to allocate one or more Resource Units (Rus) to one or more STAs;
- DL MAC and Data as allocated in the allocated RUs per STAs as indicated in the DL PHY header;
- DL Trigger Frame with additional instructions for UL communication comprising RU allocation per STA;
- Acknowledgment (Ack) or Block Acknowledgement (B Ack) for a UL data transmission from STAs transmitted during previous Framing Slots;
- and wherein the UL burst transmission period comprises one or more UL Data Units Bursts and wherein each UL Data Unit Burst of said one or more UL Data Units Bursts comprises:
- UL PHY Header comprising parameters as received in the DL Trigger Frame;
- UL MAC Header and Data allocated in RU as received in the DL trigger frame;
- Acknowledgment or Block Acknowledgement for the DL Data Units Bursts transmitted in the same or previous Framing Slots;
- continuously schedule by said AP the one or more DL Data Units Bursts during said DL transmission period to said one or more STAs; and
- continuously send said one or more UL Data Unit Bursts by said one or more STAs to said AP.

16. The AP of claim 15, wherein the DL and UL burst transmission periods in the Framing Slot have different time durations and wherein the time durations ratio between them defines TDD split.

17. The AP of claim 15, wherein each of said UL Data Unit Bursts or said DL Data Unit Bursts may have different time length based on the AP scheduling decision, and wherein the total time length of the one or more UL Data Unit Bursts cannot exceed the UL transmission period time and wherein the total time length of DL Data Unit Bursts cannot exceed the DL transmission period.

18. The AP of claim 15, wherein the plurality of Framing Slots are scheduled in a Multi-Frame.

19. The AP of claim 18, wherein the plurality of Framing Slots in said Multi-Frame are numbered and wherein one or more of said plurality Framing Slots is allocated as a Maintenance Framing Slot.

20. The AP of claim 18 wherein the Multi-Frame is a semi-synchronous Multi-Frame.

* * * * *